June 18, 1963     C. MOORE ETAL     3,094,212
AUTOMATIC COMPONENT TESTER
Filed Dec. 14, 1961     13 Sheets-Sheet 1

INVENTORS:
CLIFFORD MOORE
WALTER S. WUEST
ELMER R. ZUEHLKE

BY

ATTORNEYS

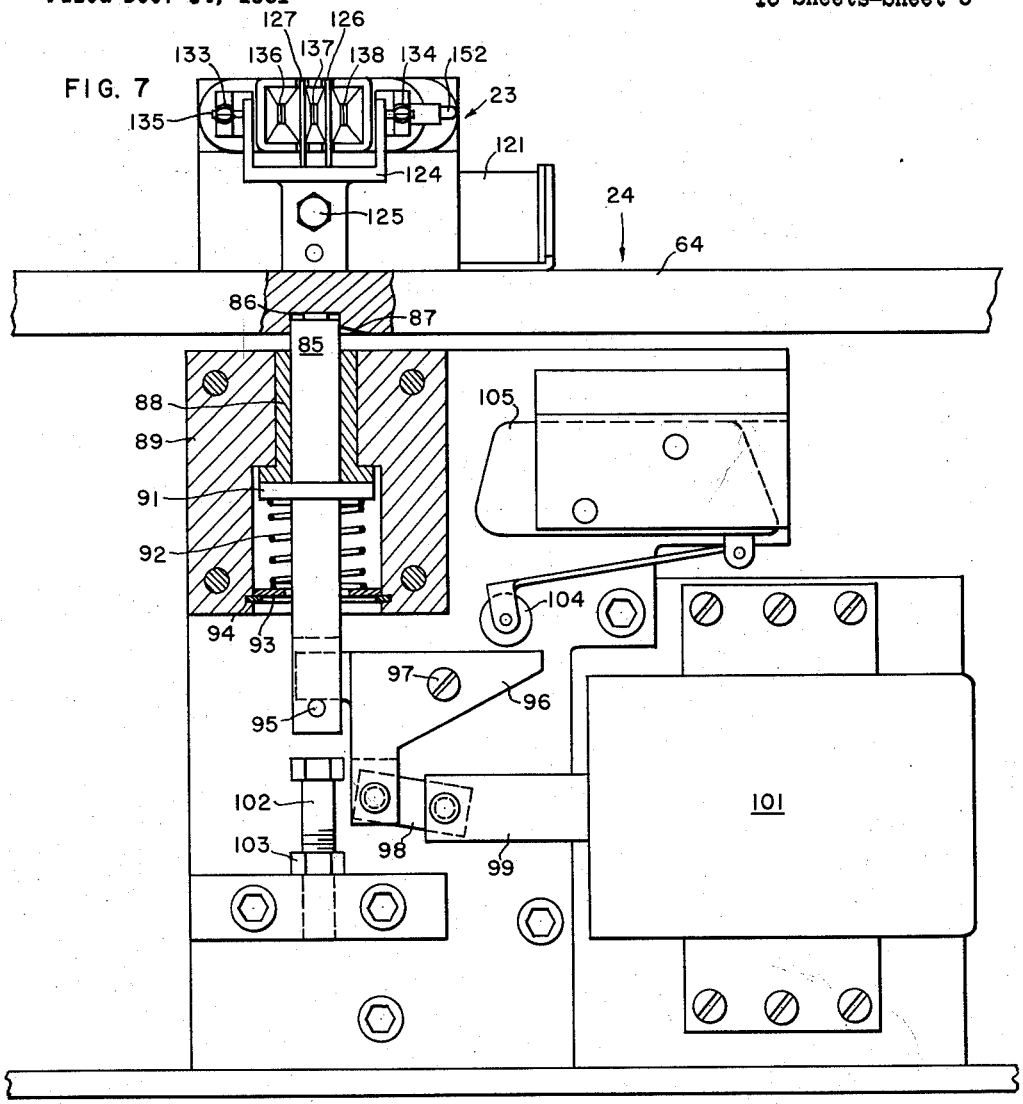

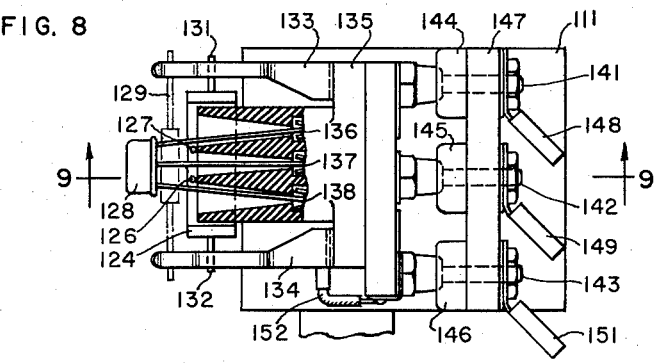
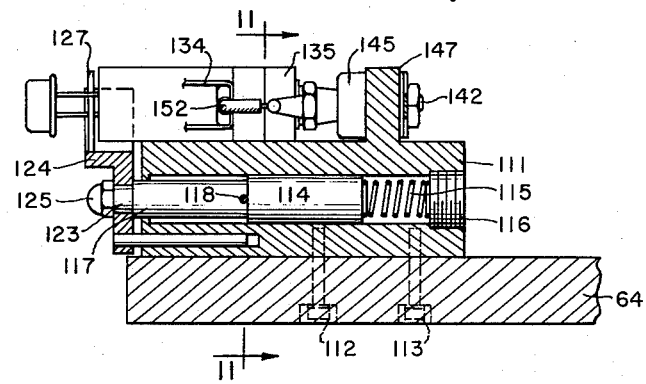
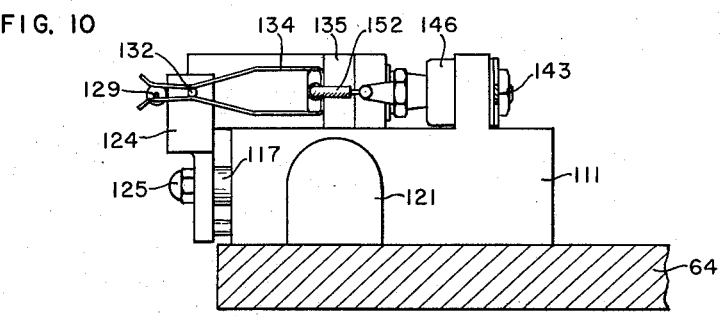
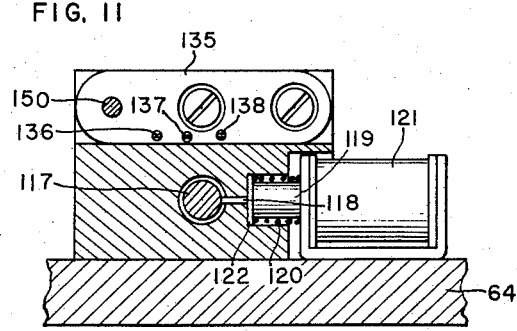

June 18, 1963
C. MOORE ETAL
3,094,212
AUTOMATIC COMPONENT TESTER
Filed Dec. 14, 1961 — 13 Sheets-Sheet 10

June 18, 1963

C. MOORE ETAL 3,094,212

AUTOMATIC COMPONENT TESTER

Filed Dec. 14, 1961

United States Patent Office 3,094,212
Patented June 18, 1963

3,094,212
AUTOMATIC COMPONENT TESTER
Clifford Moore, Tujunga, Walter S. Wuest, Glendale, and Elmer R. Zuehlke, Van Nuys, Calif., assignors to General Precision, Inc., a corporation of Delaware
Filed Dec. 14, 1961, Ser. No. 159,256
20 Claims. (Cl. 209—75)

This invention relates to an automatic component tester and more particularly to semi-automatic test equipment designed especially for quality, assurance testing or sorting of electronic components or small electronic assemblies.

Many different types of apparatus have been proposed for testing various different kinds of electronic components, however, most of these devices are designed especially to test one particular kind of electronic component, or, if they are designed for testing of different types of components, the operator is required to insert the component manually in one of a number of different receptacles and perform a series of individual tests in sequence on the particular component. Furthermore, the prior testing equipment did not make any provision for self-checking of the test circuit itself with provision for visually indicating an error in the testing circuit, or in an automatic machine for stopping the testing cycle until the error had been corrected.

Briefly stated, one preferred embodiment of the semi-automatic test equipment of the present invention consists essentially of a rotating turntable on which a plurality of component holders are mounted and electrically connected through a set of rotary and fixed contacts to an electronic console. Each of the plurality of fixed contact sets is associated with an individual test module and a test station, where the component is ejected into a collection bin, if it fails to meet the test requirements of the particular module. If the component meets all of the test requirements at all stations, it is automatically ejected into another bin for satisfactory components. Each component is subjected to a series of different tests at successive stations, but all of the tests are applied simultaneously to a number of different components during the test cycle or dwell time. The entire operation is controlled by an electronic timer which initiates the table indexing by pulling out a table detent pin and actuating a microswitch which in turn energizes a magnetic clutch to connect the motor through a gear reducing unit to drive the table. When the table moves through one position the detent pin drops into an index hole, reversing the microswitch and opening the drive clutch, and also signalling the timer that the table has stopped moving. The timer then applies power to the test component, and, after a controllable delay for soak purposes, applies a second source of power to the component for the actual test. A thyratron reject circuit is then armed, and may be fired or not according to the test results to actuate the reject solenoids, after power has been removed from the components under test. An interlock is then closed permitting the dwell timer to again index the table.

While the turntable is indexing, a self-check error circuit is energized to detect any machine malfunction, and, if there is any error in any one of the modules, a master error lamp is lighted on the front panel, and the machine stops cycling and will refuse to run until the error release button has been depressed, after the source of trouble has been corrected.

During the next test cycle a new component is inserted into the holder by the operator, during the time the table is at rest.

A number of different test modules have been provided and one or more of each type of test module may be included in the electronic console, in addition to the power supplies and the timer, depending on the particular tests which are required for the component or circuit being tested. Each of the test modules may be individually adjusted to automatically measure current, voltage, resistance, amplification factor, voltage drop or any other specific characteristic of the component or circuit. These adjustments are readily made by calibrated control knobs on the front panels of each of the test modules. The timer module may also be readily adjusted to vary the dwell time and the soak time, and a selector switch convenient to the operator facilitates selection of the different modes of operation including automatic, manual, test and self-test.

One object of the present invention is to provide a semi-automatic test equipment for quality, assurance testing or sorting of electronic components or small electronic assemblies which is extremely versatile and may be readily adjusted and adapted to test substantially all of the critical characteristics of any electronic component or circuit with a minimum of technical knowledge and manual dexterity required for its operation.

Another object of the present invention is to provide a semi-automatic test equipment which will automatically sort out and deposit the components into various bins according to the results of the various tests, and in which catastropic machine failures or drifts out of specification results in the machine stopping with lights indicating the area of failure.

Other objects and many of the attendant advantages of this invention will be readily appreciated as the same becomes better understood by reference to the following detailed description, when considered in connection with the accompanying drawings, wherein:

FIGURE 7 is a sectional view taken on the line 7—7 of FIGURE 6 and illustrating further details of the drive mechanism and the electro-mechanical interlock for indexing the table;

FIGURE 8 is an enlarged detailed view with portions in section illustrating one preferred form of one of the component holders illustrated in FIGURE 4;

FIGURE 9 is a detailed sectional view taken on the line 9—9 of FIGURE 8;

FIGURE 10 is a side elevational view of the holder shown in FIGURE 8;

FIGURE 11 is a detailed sectional view taken on the line 11—11 of FIGURE 9;

Figure 12:
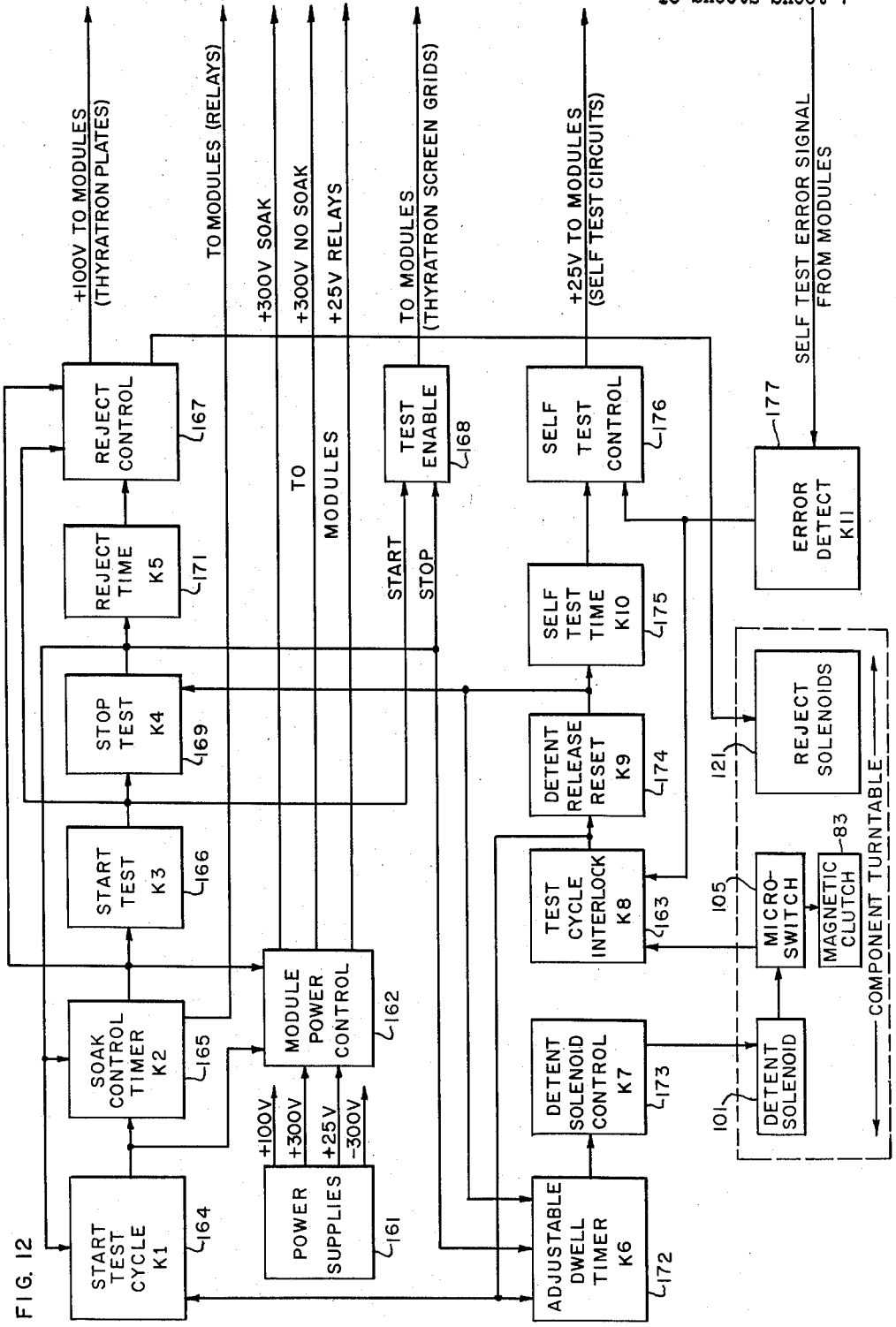
FIGURE 12 is a block diagram illustrating one preferred embodiment of the timer circuit.
Figure 14:
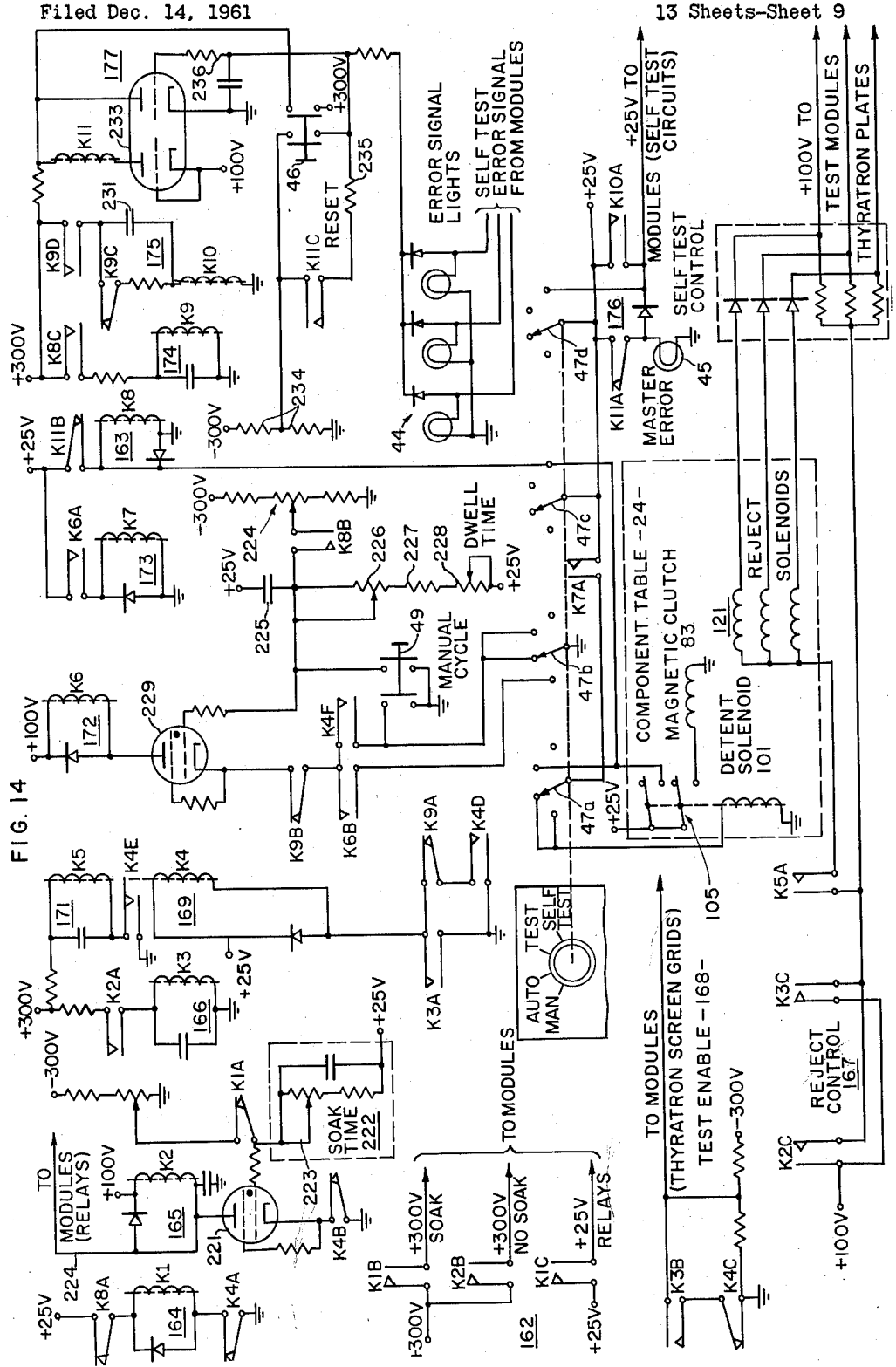
Figure 15:
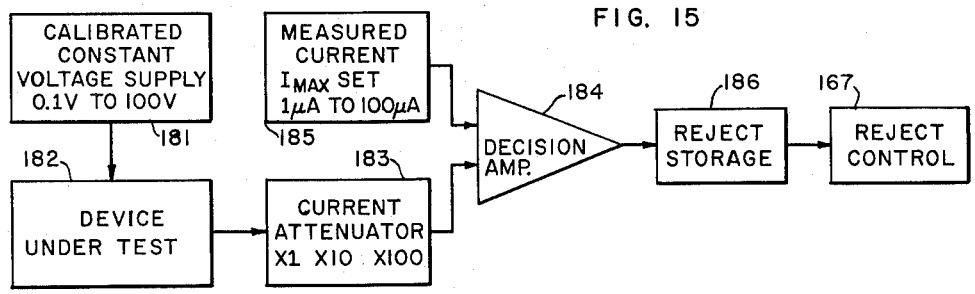
Figure 16:
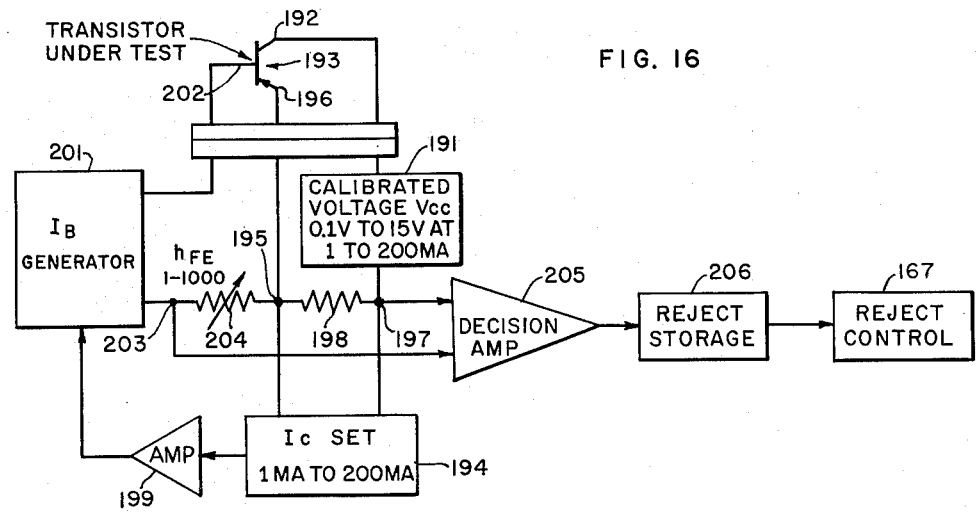
Figure 17:
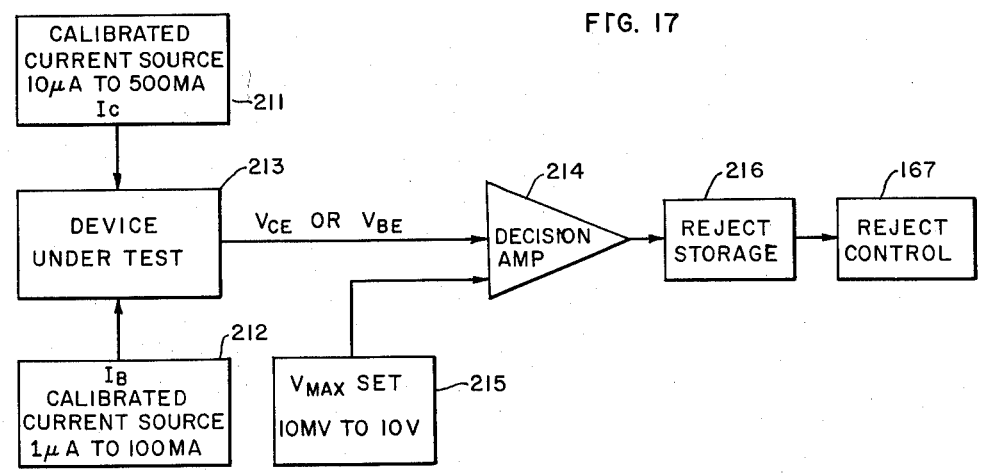

FIGURE 14 is a detailed circuit diagram illustrating one preferred embodiment of the test circuit which is shown in block diagram form in FIGURE 12;

FIGURE 15 is a block diagram of one test module (A) which may be used to automatically measure current, voltage or resistance;

FIGURE 16 is a block diagram of another test module (B) which is adapted to test the forward D.C. current gain $h_{FE}$ of transistors;

FIGURE 17 is a block diagram of another test module (D) which is a versatile voltage measuring circuit which may be used to measure the saturation voltage ($V_{CE\ (SAT)}$ or $V_{BE}$) of transistors, or the voltage across resistors, diodes, etc.

Figure 18:
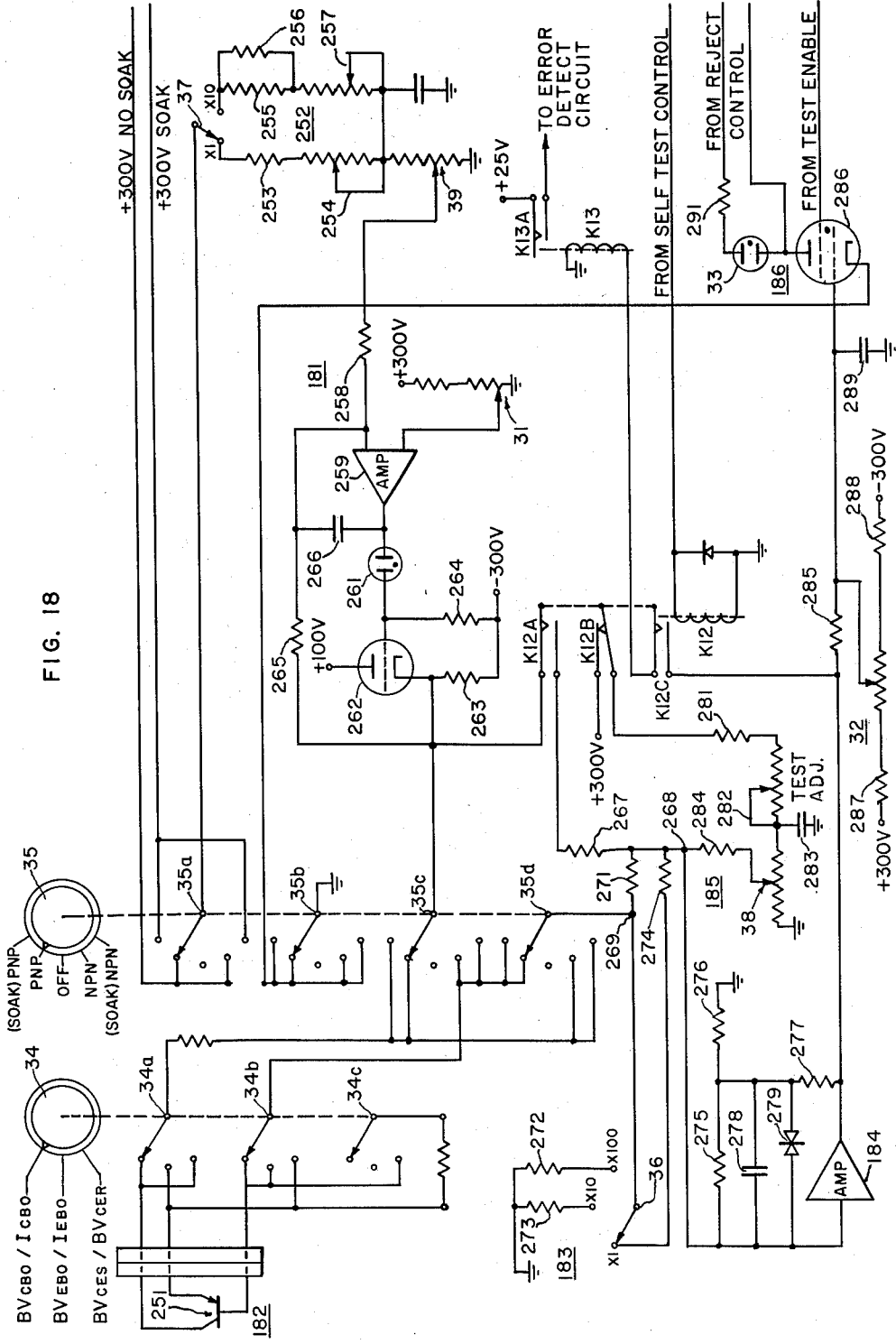
Figure 19:
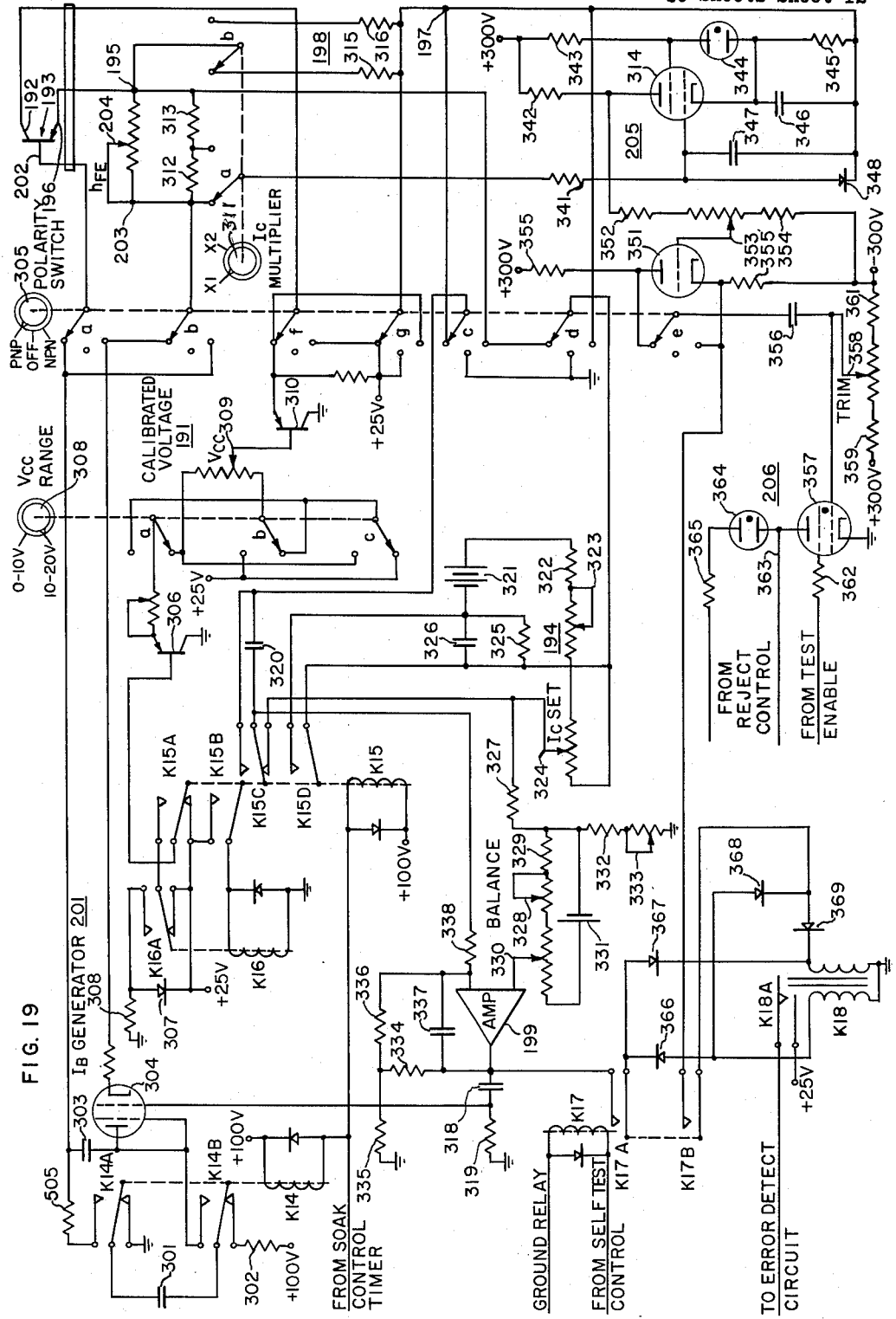
Figure 20:
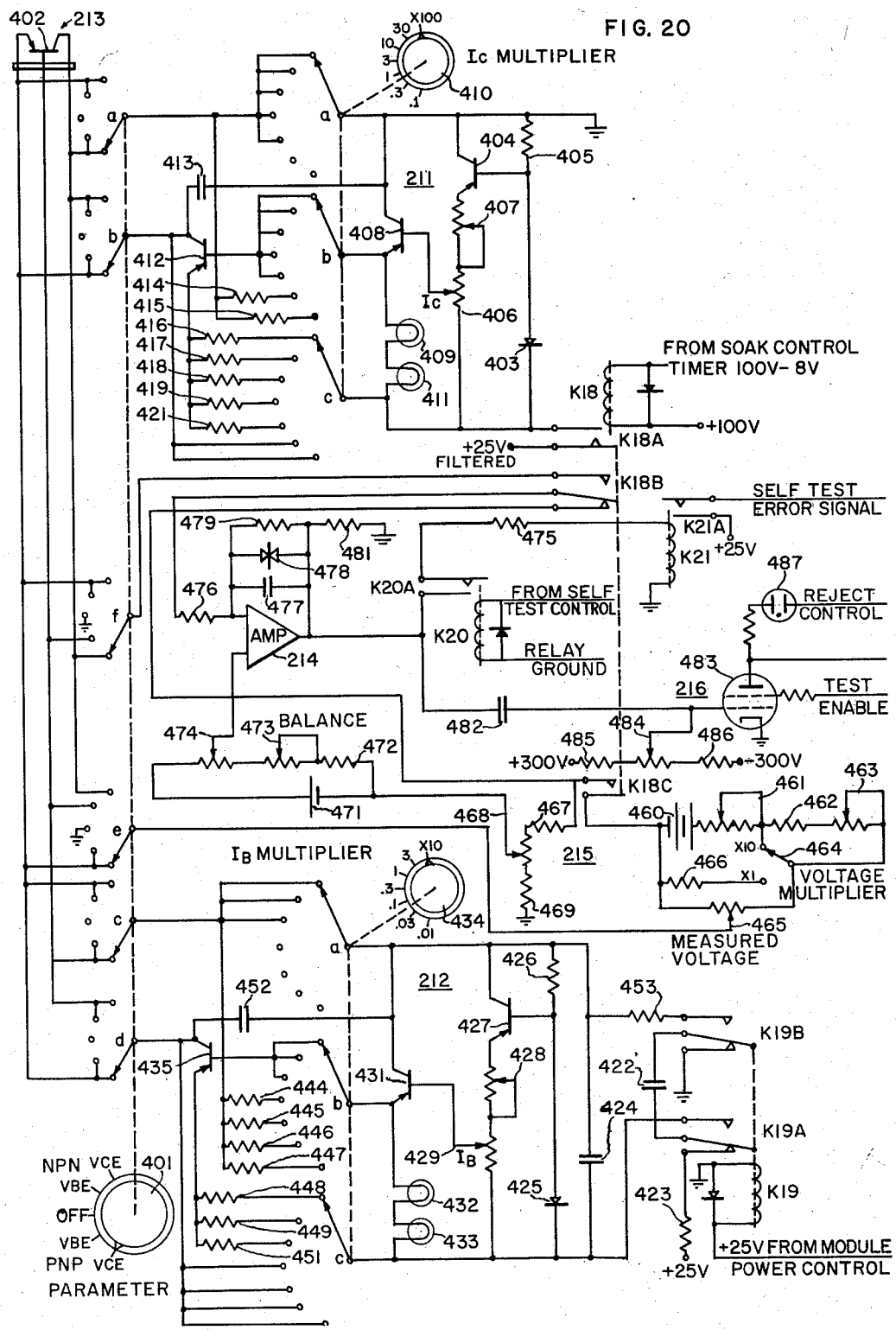

FIGURE 18 is a detailed circuit diagram of the test module (A) which is shown in block diagram form in FIGURE 15;

FIGURE 19 is a detailed circuit diagram of test module (B) which is shown in block diagram form in FIGURE 16;

FIGURE 20 is a detailed circuit diagram of test module (D) which is shown in block diagram form in FIGURE 17.

Referring now to the drawings in detail and more particularly to FIGURES 1 through 11, the cabinet and mechanical handling console is shown with details of the turntable, drive mechanism and component holders.

Figure 1:
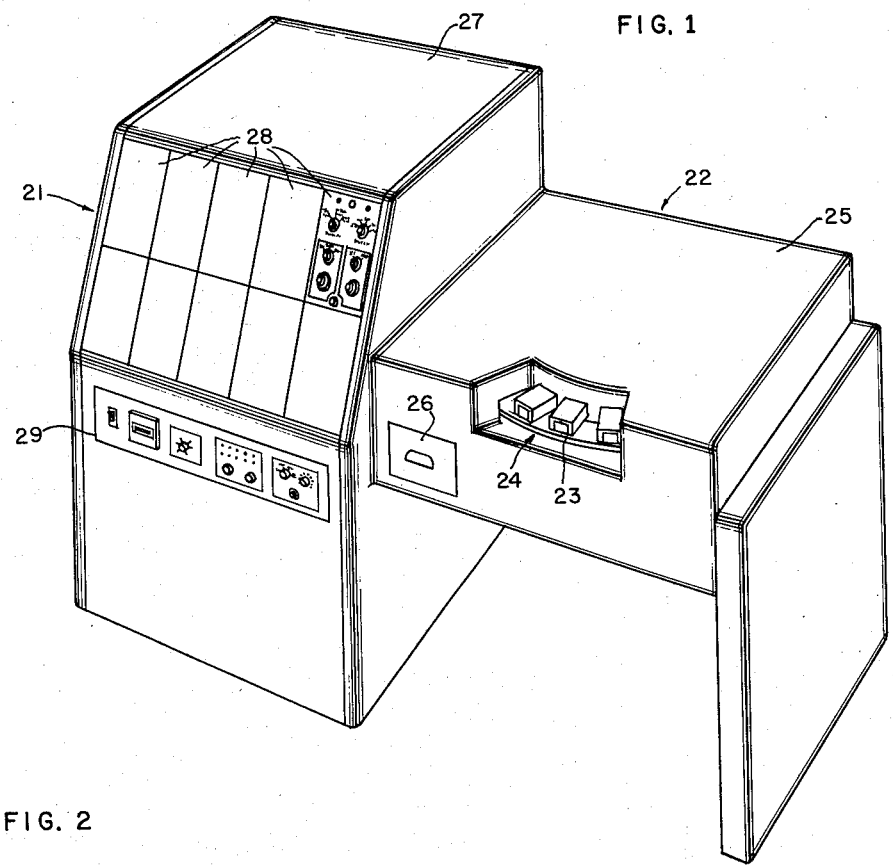
FIGURE 1 is a pictorial view illustrating one preferred embodiment of the present invention and showing an external view of the combined electronic console and mechanical handling console mounted in a suitable cabinet.
Figure 2:
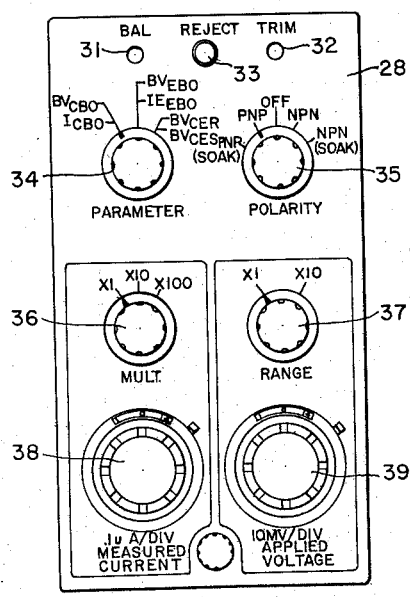
FIGURE 2 is an elevational view of the front panel on one of the typical test modules and shows the calibrated control knobs for selecting the particular test to be made and adjusting the module for the critical values required for a specific test on any particular component.
Figure 3:
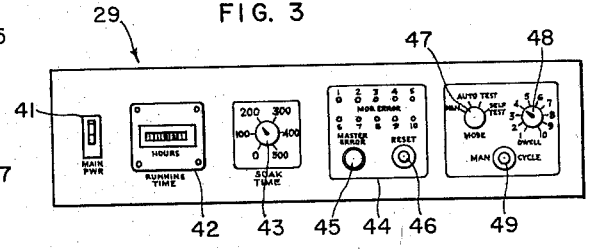
FIGURE 3 is an elevational view of the control panel on the electronic console of FIGURE 1 and showing the selector switches and signal lights for controlling the operation of the equipment.

As shown in FIGURES 1, 2 and 3, the electronic console 21 and the mechanical handling console 22 are mounted in a suitable cabinet, where the operator may be seated to insert the components in one of the holders 23 on the turntable 24 through an opening in the front of the removable cover 25 which encloses the turntable 24. A slideable drawer or bin 26 is provided in the front of the mechanical console 22 to receive and remove the components which have passed all of the tests.

The electronic console 21 is housed in a suitable cabinet 27 with an inclined front on the upper portion which in the present instance receives ten of the removable test modules 28 with their control panels readily accessible for adjustment and selection of the modes of operation for the particular components being tested.

A control panel 29 on the lower part of the cabinet 27 is readily accessible and visible to the operator for manipulation of the switches and control knobs to control the operation of the machine and observe the indications of any errors during the self-test portion of the cycle.

One of the typical control panels which is for the commonly used test module (A) is illustrated on an enlarged scale in FIGURE 2 and has readily accessible balance and trim, screw driver adjustments 31 and 32 at the top of the panel 28 along with a reject indicator light 33. A control knob 34 may be utilized to select the particular parameters to be tested which will be described in detail in connection with the specific circuitry. Another control knob 35 is set for the particular polarity and type of test (soak or no soak) for PNP or NPN transistors. Another control knob 36 sets the multiplication factor for the test circuit and the control knob 37 adjusts the voltage range. The dial 38 provides a fine potentiometer adjustment of the current at one microamp per division and the dial 39 provides a fine potentiometer adjustment for the voltage range at one tenth of a volt per division.

The control panel 29 is shown in detail on an enlarged scale in FIGURE 3 and is provided with a main power switch 41 and a dial indicator 42 which shows the running time of the machine in hours. The calibrated control knob 43 is used to set the soak time and is calibrated in milliseconds.

An error indicator 44 has ten small indicator lights to show an error has been detected in any one of the ten modules, and also a large master error indicator light 45 with a reset button 46 whose function is to restart the machine, after the source of trouble has been corrected, and will be described in detail subsequently. Another control knob 47 is utilized to select the particular mode of operation of the machine which may be manual, automatic, test or self-test with connections to the timer to control the operation in a manner which will be described in conjunction with the specific circuitry of the timer circuit. Another control knob 48 is used to set the dwell time and is calibrated in seconds to control the time during which the operator may insert the component, while the tests are being made on the other components.

A pushbutton switch 49 is utilized by the operator to control the operation of the machine during the manual mode of operation.

Figure 4:
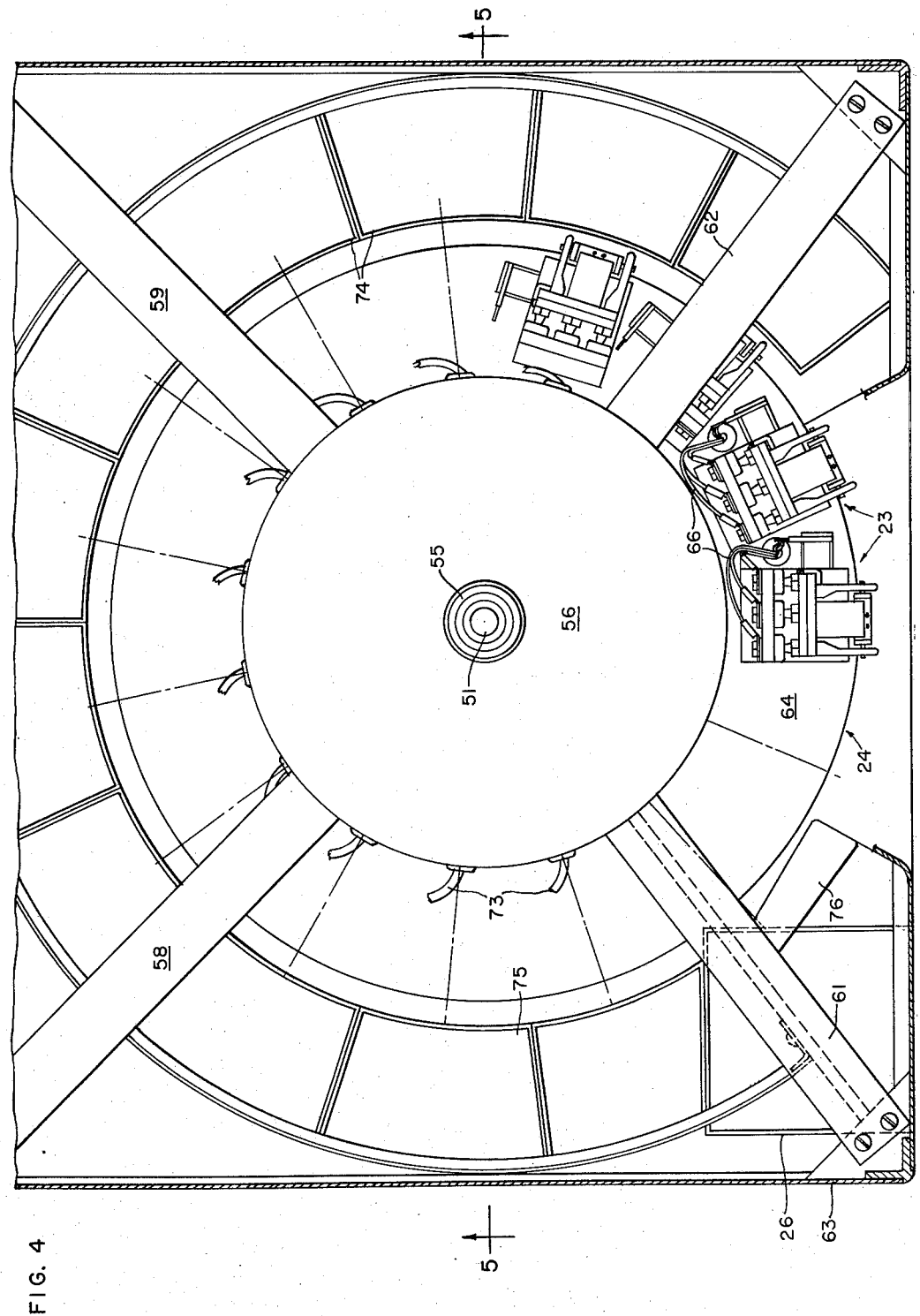
FIGURE 4 is a plan view of the turntable in the mechanical handling console with the cover removed.
Figure 5:
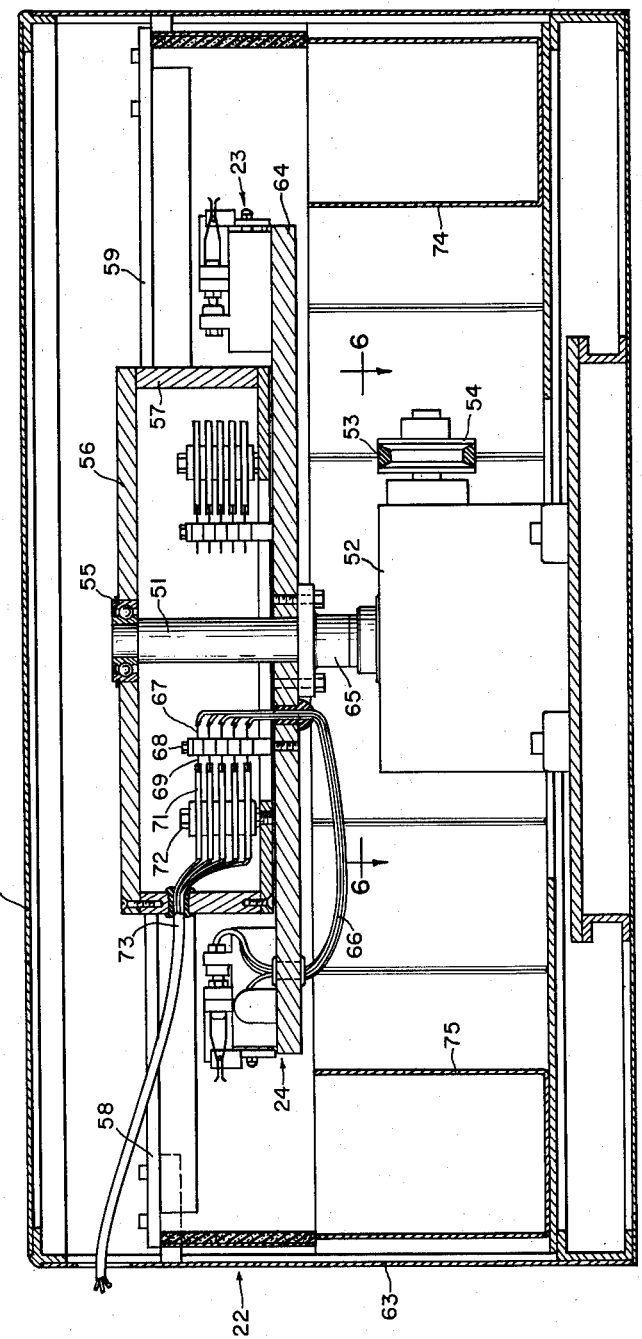
FIGURE 5 is a sectional view through the turntable of the mechanical handling console taken on the line 5—5 of FIGURE 4.

FIGURES 4 and 5 respectively show a plan view of the turntable 24 with the cover 25 removed and a sectional view taken on the line 5—5 of FIGURE 4, both of these figures being on an enlarged scale.

The turntable 24 is mounted on the rotary shaft 51 extending from the gear box 52 which is driven by a belt 53 through the pulley 54.

The upper end of the shaft 51 is rotatably supported in a bearing 55 mounted in the removable cover plate 56 which is removably secured to a circular housing 57 mounted on a rigid framework having diagonal braces 58, 59, 61 and 62, in turn secured to the external housing 63 on the mechanical handling console 22.

The turntable 24 itself consists of a rotary bedplate 64 mounted on a flanged sleeve 65 secured on the shaft 51 for rotation therewith.

A plurality of identical component holders 23 are rigidly mounted on the rotary bedplate 64 and will be described in detail in conjunction with the enlarged detail views of FIGURES 8 through 11.

Each of the component holders 23 is connected electrically through a group of wires 66 to corresponding lugs 67 on a terminal post 68 and to the corresponding rotary contacts 69 which engage the respective fixed contacts 71 which are mounted on the post 72 and to the cabled group of wires 73 extending to one of the test modules 28 which are mounted in the electronic console 21.

In the particular model of the automatic component tester illustrated herein fifteen of the component holders 23 are provided on the turntable 24 and ten test stations are provided around the periphery of the turntable 24. Each of these test stations is provided with a collection bin such as those shown at 74 and 75 to receive the rejected components which are ejected at that particular station. Another station 11, where the components are ejected which have passed all of the previous tests is located adjacent the sliding drawer 26 which receives all of the acceptable components. The next station 12 is provided with a cam 76 for mechanically resetting the ejection mechanism on the component holder 23 in a manner to be described in conjunction with FIGURES 8 through 11.

The remaining three stations 13, 14 and 15 are within the opening in the front of the cover 25, where the operator may load new components into the holders for testing at the ten subsequent test stations.

Figure 6:
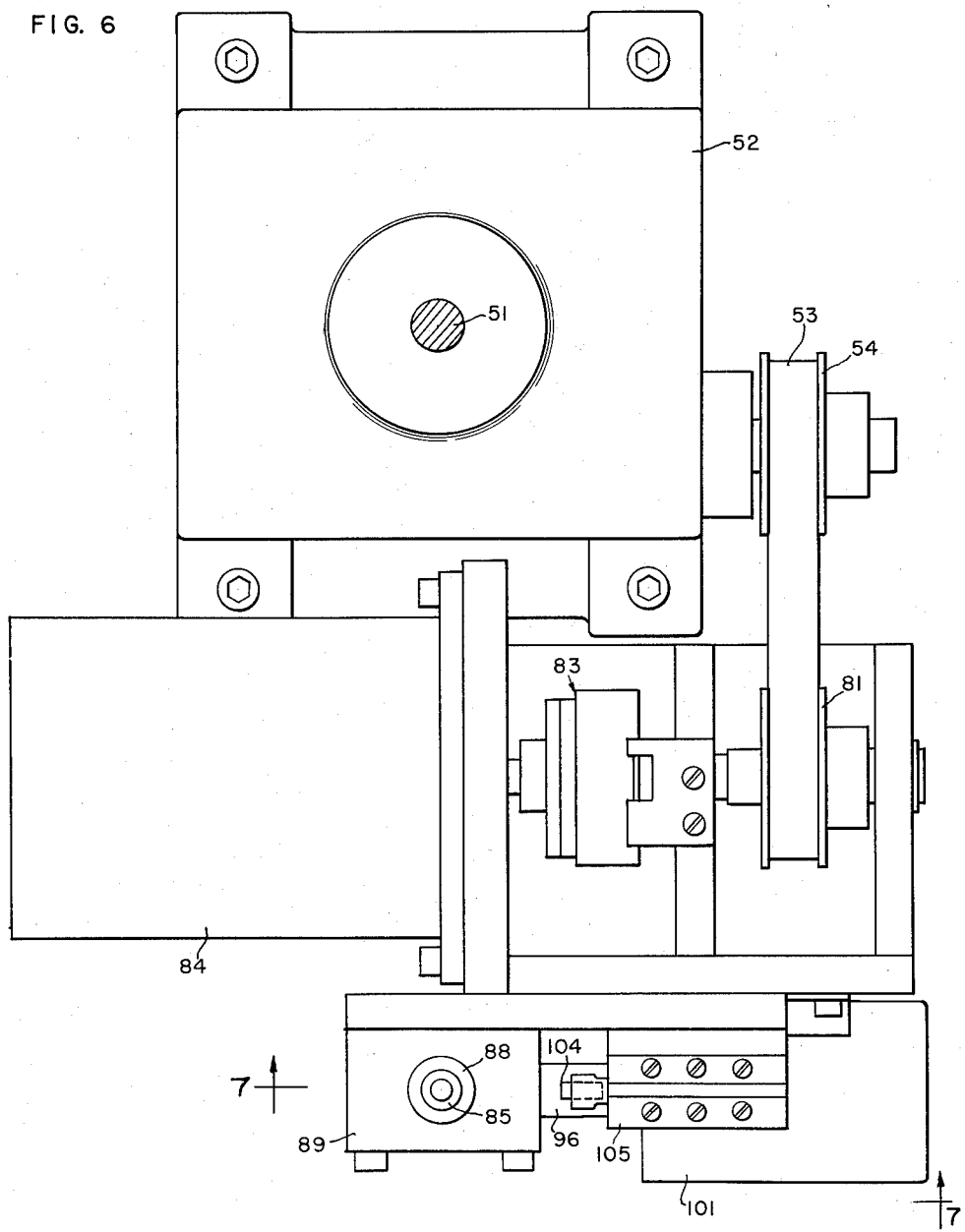
FIGURE 6 is a sectional view taken on the line 6—6 of FIGURE 5 and illustrating the drive mechanism on an enlarged scale.

The rest of the drive mechanism as well as details of the indexing mechanism are more clearly shown in FIGURES 6 and 7, wherein FIGURE 6 is a sectional view taken on the line 6—6 of FIGURE 5 and FIGURE 7 is a sectional view taken on the line 7—7 of FIGURE 6.

The shaft 51 extending from the gear box 52 driven by a belt 53 through pulley 54 is shown also in FIGURE 6, wherein the belt drive 53 also extends around a drive pulley 81 connected through an electrically actuated magnetic clutch 83 to the motor 84.

If desired a friction clutch (not shown) may be added which would provide a safety factor to prevent damage to the mechanism, and also injury to the operator's hands, if jammed in the turntable, and the magnetic clutch 83 provides for electronic control of the starting and stopping of the turntable 24.

FIGURES 6 and 7 also show details of the detent locking mechanism for indexing the turntable 24 including a detent pin 85 which engages in an indexing hole 86 having a tapered slot 87 which guides the pin 85 into the hole 86 as the turntable 24 moves to its next test station.

The detent pin 85 is slideably mounted in a sleeve 88 which may be press fitted in the mounting block 89. Detent pin 85 is provided with a collar 91 which engages one end of the spring 92, the other end of spring 92 engaging a washer 93 held in position by a retainer ring 94.

The bifurcated lower end of the detent pin 85 has a transverse pin 95 engaging one end of a lever 96 pivotally mounted on a pivot pin 97 and actuated by a link 98 connected to the armature 99 of a solenoid 101.

The downward movement of the detent pin 85 is limited by the head of an adjusting screw 102 which may be locked in a predetermined position by the lock nut 103.

Figure 13:
FIGURE 13 is a graph which illustrates the timing sequence of the timer circuit shown in FIGURES 12 and 17 by graphically portraying the duration for different relays in the test circuit on a comparative time basis.

One end of the lever 96 also engages the roller 104 on a double microswitch 105 which performs certain functions in a connection with the timing circuit in a manner to be described in conjunction with FIGURES 12, 13 and 14.

One particular form of the component holder 23, which is particularly adapted for use with transistors, diodes and resistors, or with other components having three terminals extending in one direction or two axial terminals extending in opposite directions, is shown mounted on the bedplate 64 of turntable 24 in FIGURE 7 and also in the detailed views of FIGURES 8, 9, 10 and 11.

It will be obvious that many other different types of holders for specific components or circuit boards may be utilized in conjunction with the turntable 24 and mounted on the bedplate 64 in the proper position for use in conjunction with the component tester of the present invention. As many fixed and rotating contacts may be provided as is necessary for testing any particular component or circuit board at a particular station or stations on the turntable 24.

The holder 23 as illustrated herein comprises a base 111 which may be secured to the bedplate 64 by any suitable means such as the machine screws 112 and 113, shown by dotted lines in FIGURE 9, and is provided with a cylindrical bore therethrough which receives the plunger 114 resiliently urged in a radially outward direction by the spring 115 which is retained in position by the threaded plug 116 engaging the inner threaded end of the radial bore. The plunger 114 has an outer portion 117 of reduced diameter which provides a shoulder for engagement by detent pin 118 on the armature 119 of the reject solenoid 121 which releases the plunger 114 when actuated. The armature 119 is resiliently urged towards the plunger 114 by a spring 120 engaging the collar 122.

The outer end of the plunger 114 is again reduced in diameter at 123 to provide another shoulder for seating the ejector yoke 124 which is retained on the threaded end of the plunger by a suitable nut 125.

The yoke 124 is provided with two upwardly projecting rods 126 and 127 which are adapted to fit between the three leads of a transistor 128 which is shown positioned in the holder 23 in FIGURES 8 and 9. The yoke 124 is also provided with two upward extending arms at its outer end for engaging the axial leads of a component such as the resistor or diode shown at 129 in FIGURE 8 in phantom lines, and in FIGURE 10.

The yoke 124 also has two outwardly extending pins 131 and 132 which extend between the resilient arms of the spring contacts 133 and 134 to spread these contacts when the yoke 124 is in its outer position, as shown in FIGURE 10 to facilitate insertion and ejection of the axial lead components 129.

The holder 23 is also provided with a three contact receptacle 135 which has three tapered openings and three sets of resilient contacts indicated by the numerals 136, 137 and 138, which are adapted to receive the three leads of a component, such as a transistor 128.

The receptacle 135 is adapted to be detachably mounted on the base 111 by three resilient prongs 141, 142 and 143 engaging the corresponding socket contacts 144, 145 and 146 mounted on a flange 147 extending upwardly from the base 111, and these contacts are connected to the respective leads 148, 149 and 151 as shown in FIGURE 8. These prongs 141, 142 and 143 are connected by internal connections, not shown, to the contacts 136, 137 and 138, and the two outer prongs 141 and 143 are also connected to the spring contacts 133 and 134 by suitable connections, one of which has been indicated as the external connection 152 between the spring contact 134 and prong 143, and an internal connection 150 shown in FIGURE 11.

Two leads (not shown) extend from the reject solenoid 121 and together with the leads 148, 149 and 151 form the group of wires 66 which are connected to the lugs 68 on the terminal post 28, as shown in FIGURE 5.

*Timing Circuit*

Referring now to FIGURE 12, the timer circuit is shown in block diagram connected to a power supply 161 which may be a single unit which will provide plus and minus 300 volts, plus 100 volts and plus 25 volts, but is preferably four separate power supply units and a filter, which would occupy the bottom shelf of the electronic console 21. Two of these power supplies furnish plus and minus 300 volts for certain parts of the timer circuit and for the D.C. amplifiers in the test modules, as well as a reference voltage, and the plus 300 volts to other circuits in the test modules is controlled by the module power control circuit 162.

A third power supply furnishes plus 100 volts to the reject solenoids, relays and various circuits which will be described in detail subsequently, and the negative terminal is tied to ground.

The fourth supply furnishes plus 25 volts to the table detent solenoid, magnetic clutch and relays, as well as the constant current circuits in the test modules. The latter circuits also receive the benefit of an additional filter. The unfiltered plus 25 volt supply to certain relays in the test modules is also controlled by the module power control 162. The negative terminal on this supply is also tied to ground.

The timing circuit itself may be mounted on a shelf directly above the power supplies in the electronic console 21 and has various connections to the control panel 29 and to the terminals on the turntable 24 and also to the ten removable test modules 28.

Actually, the timing circuit of FIGURE 12 is two interlocked timers. One provides a variable delay for the table motion and thus varies the time allotted to the operator for loading components into the component holder 23, and the other provides the switching sequence needed to perform the electrical tests.

The switching sequence during the automatic test cycle will be clearly apparent by considering the block diagram of FIGURE 12 in conjunction with the graphical relay timing diagram of FIGURE 13 wherein the time during which each relay is energized is indicated on a time basis by the shaded bars.

The test cycle is initiated when the component table 24 reaches the next test station and the detent pin 85 drops into the next index hole 86 which will open the contacts of microswitch 105 which deenergizes the magnetic clutch 83 and also drops out the relay K8 in the test cycle interlock circuit 163.

Dropping out the relay K8 energizes the start test cycle circuit 164, and also performs other functions which will be described in detail subsequently in the test sequence.

The relay K1 in the start test cycle 164 closes contacts in the module power control 162 to control the plus 300 volts to the soak terminals of the modules and plus 25 volts to certain circuits in the test modules.

The start test cycle 164 also initiates the operation of the soak control timer 165, and, after a variable time delay which may be set by the soak control knob 43 on the control panel 29 for any period from 20 to 500 milliseconds, the relay K2 in soak control timer 165 is actuated and controls the application of plus 300 volts to no soak terminals of the modules through the module power control 162. The soak control timer 165 also initiates the start test circuit 166 and closes certain contacts in the reject control circuit 167 to apply plus 100 volts to the screen grids of the thyratrons in the modules reject storage circuits and through another connection removes plus 100 volts to certain relay circuits in the test modules.

The start test circuit 166 through relay K3 closes certain contacts in the test enable circuit 168 which grounds or removes a negative bias from the screen grids of the modules' thyratrons, thus arming the thyratrons which may be fired or not according to the test results in each particular module.

The start test circuit 166 also closes another pair of contacts in the reject control circuit 167 which continues to maintain plus 100 volts on the thyratron plate in each of the modules.

The start test circuit 166 also initiates the stop test circuit 169 which after a very short period of time energizes the relay K4 which cuts off the test enable circuit 168 and thus returns the negative bias to the screen grid of the thyratrons in the different modules to deactivate the thyratrons. While the thyratrons in the test modules will no longer be sensitive to any signals in the test circuits of the module, these thyratron circuits function as a memory unit or reject storage, since they remain in their conducting or non-conducting state until a later time in a manner which will be described subsequently in connection with the individual test modules. This very short period of time during which the test enable circuit 168 is activated is the actual test period, during which the decision is made as to whether or not a component is good or bad, and may be called the decision time.

The stop test circuit 168, after a short delay period, actuates the reject time circuit 171 which energizes the relay K5 to close another set of contacts in the reject control circuit 167. Contacts K5A apply plus 100 volts to a reject solenoid (not shown) at station 11 which is connected directly to ground for ejecting unsatisfactory components, and also to the other reject solenoids 121 in FIGURE 14, which connects plus 100 volts through the reject solenoids to the corresponding thyratron plates.

If the component is bad and the thyratron in the particular module has been fired, the corresponding reject solenoid 121 is activated during the period established by the reject time circuit 171. Obviously, if the thyratron in the test module has not been fired, when a good component has been tested, then the corresponding reject solenoid is not actuated.

It should be noted that the relay K4 in the stop test circuit 169 also serves to cut off the start test cycle circuit 164 and drop relay K1 which in turn cuts out the soak control timer circuit 165 and drops relay K2.

After relay K2 has dropped out, after a fixed period of time, the relay K3 is dropped due to the RC time delay in the start test circuit 166. This ends or terminates the reject time as indicated on the graph of FIGURE 13 which extends from the time K5 is picked until the time K3 is dropped.

Since the actual testing has been completed and also the rejection of any bad components at this particular time, the turntable 24 will remain at rest for the duration of the dwell time, as set by the dial 48 on the control panel 29, until the operator has inserted a new component and the adjustable dwell timer 172 has completed its timing cycle and energizes the relay K6.

Relay K6 actuates the detent solenoid control circuit 173 which in turn applies power to the detent solenoid 101, pulling down the detent pin 85 to release the turntable 24 and actuate the microswitch 105. Closing contacts in microswitch 105 energizes the magnetic clutch 83 and the test cycle interlock circuit 163 to energize relay K8. Picking K8 closes contacts in the adjustable dwell timer 172 and opens contacts in the start test cycle 164, and also actuates the detent release and reset circuit 174 which energizes the relay K9 after a certain fixed delay period.

Picking relay K9 cuts off the adjustable dwell timer circuit 172 to drop relay K6 which in turn drops relay K7. Relay K9 also opens normally closed contacts to cut off the stop test circuit 169 which drops out the relay K4 which in turn drops out the relay K5. In effect relay K9 resets all these circuits, so that they are ready for the next test cycle.

Dropping relay K7 in the detent control circuit 173 deenergizes the detent solenoid 101 and releases the detent pin 85 to engage bedplate 64 on turntable 24, which is still moving. However, the detent pin does not move sufficiently to transfer the microswitch 105 until the detent pin 85 drops into the next index hole 86 to end the table motion and start a new cycle.

Relay K9 also initiates the self test time circuit 175 which energizes the relay K10 for a very short period of time to apply plus 25 volts to the self test circuits in the test modules. The self test takes place during the period of time for table motion. If any error signal is received from any one of the modules as a result of the self test, indicating that the module is not operating properly, the error signal is applied to the error detect circuit 177.

If the error detect circuit 177 receives an error signal from any one or more of the modules, the normally energized relay K11 is dropped and the corresponding signal lights on the control panel 29 will be lighted, as well as the master error signal light 45 on the error indicator 44. The test cycle interlock circuit 163 is also locked in its energized condition by contacts closed by dropping the relay K11, so that the machine cannot continue to operate, since the next test cycle cannot be initiated by dropping relay K8. Dropping relay K11 also closes contacts in the self test control circuit 176, so that the test voltage is maintained on the modules by the self test control circuit 176, until the error or malfunction in the particular module has been corrected, at which time an error release or reset button 46 on the control panel 29 is depressed to energize relay K11 in the error detect circuit 177 and open the contacts in the test cycle interlock circuit 163, thus dropping relay K8 and permitting the next test cycle to start.

Energizing relay K11 in the error detect circuit 177 will also open the contacts in self test control circuit 176 to remove the plus 25 volts from the self test circuits in the modules.

The error detect circuit 177 and relay K11 are normally energized by connections to the plus 300 volt power supply and to the plus 100 volt power supply, so that if the 100 or 300 volt power supply fails, or if the relay itself fails, an error is indicated by lighting the master error signal light 45 on the error indicator 44 of control panel 29. The machine will not continue to operate under these conditions, since the contacts in the test cycle interlock circuit 163 between the 100 volt supply and the K8 relay to ground are closed thus preventing any operation or cycling of the machine when the relay K11 is not energized.

FIGURE 14 is a detailed circuit diagram of one preferred embodiment of the timer circuit of the present invention, showing schematically certain connections to parts of the mechanical handling console 25 and turntable 24, as well as connections to the control panel 29 and the test modules 28. The timing circuit has four different modes of operation which may be selected by the control knob 47, and will be described first in the automatic mode or continuous cycle with the four switches connected to knob 47 in the auto position.

*Automatic*

The timing circuit is actually two interlocked and both of these timers receive their start signal from the detent pin 85, when it drops into the next index hole and opens the contacts of double microswitch 105.

Opening of the contacts in the microswitch 105 de-energizes the magnetic clutch 83, and also removes the 25 volt supply from the relay K8 in the test cycle interlock 163 which will drop this relay, if there has been no error signal during the self test cycle and the contacts K11B to another 25 volt source are open. Dropping the relay K8 will permit the contacts K8A to return to their normally closed position connecting the relay K1 to a 25 volt source, and since the contacts K4A are normally closed to ground, the relay K1 in the start test cycle 164 will be energized.

Picking of relay K1 causes contacts K1B and K1C to close in the module power control 162 and provide plus 300 volts to test the modules for soak purposes and plus 25 volts to certain relays in the modules. Relay K1 also opens the contacts K1A in the negative biasing circuit to the grid of the thyratron tube 221 in the soak control timer circuit 165.

The negative bias on tube 221 discharges at a rate determined by the RC time constant of the soak control timing circuit 222 which may be varied by the adjustable resistance or potentiometer 223 which is connected to the soak time control knob 43, as shown in FIGURE 3. At some particular voltage, such as minus 2 volts, the thyratron 221 will fire energizing the relay K2, and also removing plus 100 volts to additional relays in the modules through the lead 224.

Energizing relay K2 closes the contacts K2A which energizes the relay K3 in the start test circuit 166, and also closes the contacts K2B in the module power control 162 which applies plus 300 volts to the no soak terminals in the modules.

Picking relay K2 further closes contacts K2C in the reject control circuit 167 to apply plus 100 volts to the thyratron plates in each of the modules.

After a short time delay relay K3 is energized and closes the contacts K3A to energize the relay K4 in the stop test circuit 169. A positive voltage of 25 volts is included to drive the relay K4.

Relay K3 also closes the contacts K3B in the test enable circuit 168 which activates the thyratron in the reject storage circuit of each module by removing a negative bias of approximately minus 50 volts from the screen grid. Contacts K3C in the reject control circuit 167 are also closed to maintain the plus 100 volts on the thyratron plates for the proper time, since the relay K2 has already closed the contacts K2C, but will drop out before the proper time.

Energizing the relay K4 opens the contacts K4A in the start test cycle circuit 164, thus dropping out relay K1 which in turn opens contacts K1A, and contacts K4B are also opened which releases relay K2 and after a certain period of time contacts K2A are opened to release relay K3. Contacts K4C in the test enable circuit 168 are opened to return the negative bias on the screen grids of the thyratrons in the test modules.

Since this removes all power from the test circuits in the modules and deactivates the reject thyratrons, K4 in effect stops the relatively short test period or decision time during which the decision is made as to whether a component is good or bad. This is indicated as the test time on the graph of FIGURE 13.

Relay K4, however, remains energized because the contacts K4D and K9A are closed in its self-holding circuit.

The relay K4 also energizes the relay K5 by closing the contacts K4E, the relay K5 being energized in the reject time circuit 171 after a certain time delay due to its RC circuit.

Relay K5 starts the reject timer by closing contacts K5A in the reject control circuit 167 which will now connect the plus 100 volts through the reject solenoids to the thyratron plates in the modules. If any of the thyratrons have been fired, as a result of the test of a bad component during the short test or decision time, they will continue to conduct, but the plate will be at a lower voltage and current will flow through the corresponding reject solenoids and eject the unsatisfactory component. When relay K3 is dropped, then the plus 100 volts is cut off and the reject time is ended, as indicated on the graph of FIGURE 13.

Relay K4 also closes contacts K4F in the dwell timer 172. At the beginning of the test cycle, when the relay K8 was dropped, the contacts K8B returned to their normally open position to initiate the dwell time in the adjustable dwell timer 163 by removing the high negative bias from the minus 300 volts source across the resistance divider network 224, and the condenser 225 starts discharging at a rate controlled by the RC time constant across the variable resistance 226, the fixed resistance 227 and the potentiometer 228 which is connected to a 25 volt source and is controlled by the dwell time control knob 48 on the control panel 29. The dwell time may be varied between 1 and 10 seconds by varying the resistance in the potentiometer 228. At some particular voltage, such as −2 volts, the thyratron 229 will fire, picking or energizing the relay K6 and thus completing the dwell time cycle.

It should be noted that the relay K6 has self-holding contacts K6B in the cathode circuit of the tube 229 which are connected to ground in the manual position of the mode selector switch 47 on the control panel 29. This will maintain the tube 229 in a conducting condition as long as the contacts K9B are in their normally closed position. The cathode of thyratron tube 229 is also connected to ground through the contacts K4F in the automatic test positions of the mode selector switch 47. This branch of the cathode circuit is also connected to ground and to the grid of the tube 229 by means of the manual cycle switch 49 on the control panel 29 to provide manual control of the cycle in the manual position of the mode switch 47 in a manner which will be described subsequently.

When relay K6 is energized and closes the contacts K6A, plus 25 volts is connected across the relay K7. Energizing the relay K7 closes the contacts K7A from a plus 25 volt source to the detent solenoid 101 which in turn pulls down the detent pin 85 and closes the contacts of the microswitch 105 to the plus 25 volts source through the magnetic clutch 23 to start the table motion, and also through the solenoid of the relay K8 to hold this solenoid until the detent pin 85 drops into the next index hole 86.

Relay K8 has three sets of contacts K8A, K8B and K8C which now perform the following functions: Contacts K8A open the circuit from plus 25 volts to the solenoid K1 and hold out this relay K1 which was dropped by opening contacts K4A. Contacts K8B in the dwell timer 172 close to again connect the grid of tube 229 to the high negative bias, but not cutting off the tube at this time. Contacts K8C also close which energizes the solenoid of relay K9 after a considerable RC time delay determined by the RC circuit or time constant of the detent release and reset circuit 174.

Relay K9 has four sets of contacts, one of which is the normally closed contacts K9B which are opened when the relay K9 is energized to cut off the cathode circuit of tube 229 and stop conduction to drop relay K6. This drops relay K7, opening contacts K7A to de-energize detent solenoid 101 which permits it to drop against bedplate 64 on turntable 24, but not enough to open the contacts on microswitch 105. Another set of normally closed contacts K9A are opened in the stop test circuit 169, thus dropping out relay K4 which returns the contacts K4A, K4B and K4C to their normally closed position in the start test cycle circuit 164, soak control timer circuit 165, and test enable circuit 168. Dropping relays K4 also open the self hold contacts K4 and the contacts K4E in the reject time circuit 171, and further opens contacts K4F in the dwell timer 172. This in effect resets all of these circuits for a new test cycle. The relay K9 also opens the normally closed contacts K9C and closes the contacts K9D from the plus 300 volts source to energize the relay R10 by a pulse from the condenser 231 for a very short period of time in the self test time circuit 175.

The relay K10 closes the contacts K10A in the self-test control circuit 176, which applies plus 25 volts to the self-test circuit in the modules.

The table motion will continue until the detent pin drops into the next index hole which now opens the contacts of microswitch 105 to deenergize the magnetic clutch 83. If there is no error signal from any one of the test modules then opening the contacts on microswitch 105 also drops relay K8 to start the next test cycle.

However, if an error signal is received from any one of the test modules, this error signal is applied to the right hand grid of the tube 233 and also lights a corresponding error signal light on the error indicator 44 of the control panel 29.

Normally, the left hand side of tube 233 is conducting which energizes relay K11 to open contacts K11A from plus 25 volts directly to the self test circuits and also opens contacts K11B in the test cycle interlock circuit 163, however, contacts K11C are held closed, so the right hand side of tube 233 is biased off by a minus 300 volts applied through the voltage divider 234, and through closed contacts K11C, resistance 235 and resistance 236 to the right hand grid of tube 233. However, when an error signal of plus 25 volts from any test module is applied to the right hand grid, this side of tube 233 will conduct and drop the voltage across relay K11 to the left hand plate, thus cutting off the left hand side of tube 233 to deenergize the relay K11. This opens the bias circuit through the contacts K11C which are now opened, and the tube 233 then remains locked in a conducting state.

Dropping relay K11 also closes the contacts K11A which lights the master error signal light and maintains a 25 volt supply to the self test circuits in the modules, and also closes the contacts K11B to apply 25 volts to the relay K8 in the test cycle interlock circuit 163. Holding relay K8 keeps contacts K8A open in the start test cycle circuit 164, and thus the machine stops cycling and will not run until the error reset button 46 has been pressed to again apply the negative bias restoring the tube 233 to its previous state.

Manual

In the manual mode of operation with the control knob 47 set to the MAN position the test cycle is the same as in the automatic mode, except for the fact that the adjustable dwell timer 172 cannot function to initiate table motion and a new test cycle, because the cathode of tube 229 through section 47b is now connected to ground through the normally open self holding contacts K6B rather than through the contacts K4F which would be closed at the end of the test cycle.

In this mode table motion and a new test cycle can only be initiated by depressing the manual cycle button and switch 49 which will ground the cathode of tube 229 through contacts K4F which will be closed at the end of a test cycle and will also ground the grid of tube 229 to assure conduction and start table motion for a single test cycle which will end when relay K3 is dropped at the end of the reject time. The turntable 24 will then stay in this position until the manual cycle button 49 is again depressed.

Test

In the test position of the mode switch 47 the connections are the same as in the manual position, except for section 47a which now connects plus 25 volts through contacts K7A directly to the K8 relay, but not through the detent solenoid 101, as in the other three positions.

This permits cycling of the timer circuit and operation of the test modules without pulling the detent pin 85 and without the turntable 24 moving, since the detent solenoid 101 and the magnetic clutch 83 cannot be energized in this position of mode switch 47.

Self-Test

In the self test position of the mode switch 47 section 47a disconnects the detent solenoid 101 through contacts K7A to plus 25 volts, section 47b disconnects the tube 229 from ground and thus deactivates the dwell timer, section 47c connects relay K8 directly to plus 25 volts and thus holds this relay and its contacts, and section 47d connects the self test circuits in the modules directly to plus 25 volts, so that these circuits can be checked and adjusted without the timing circuit and test circuits functioning.

Test Modules

Referring now to FIGURE 15, the test module A is shown in block diagram form and provides a highly flexible resistance measuring device which may be used to automatically measure the current in a transistor between the collector and the base or may be used to measure the breakdown mode or the voltage limits for the test between the collector and the base, between the collector and the emitter or the voltage between the collector and the emitter with a short or resistance between the emitter and base. This module can measure the internal resistance for diodes or the resistance of resistors, and may be used to measure current of any kind by applying a voltage between any two terminals; for example, the leakage current in condensers or the current through any other component or circuit.

Essentially, this module consists of a calibrated constant voltage supply which provides any desired voltage between 0.1 volt and 100 volts which can be applied to the device under test and the current therethrough passes through a calibrated continuously variable attenuator to a decision amplifier 184, where it is compared to the measured current 185 which may be varied from one micro-amp to 100 micro-amps, where the maximum current is set at which rejection is desired.

If the current is above the maximum set by the measured current circuit 185, the decision is stored in the reject storage 186, where it is applied to the reject control circuit 167 in the timing circuit of FIGURE 12.

FIGURE 16 is a block diagram illustrating another test module B in block diagram form, and this module automatically tests the forward D.C. current gain ($h_{FE}$) of low to medium power PNP or NPN transistors. The test may be made at any collector voltage between 0.1 and 15 volts and collector currents between 1 milliamp and 200 milliamps.

One advantage of this circuit lies in the fact that $h_{FE}$ is measured at a specified collector current, rather than at an arbitrary base current which would produce the specified collector current only with a design center transistor.

This module B consists of a calibrated voltage source 191 which is applied to the collector 192 of the transistor 193 which is under test. The collector voltage source 191 may be adjusted to provide from 0.1 volt to 15 volts at 1 to 200 milliamps. The base current drive or $I_c$ set circuit 194 is connected through the junction point 195 to the emitter 196 of the transistor 193 and also through the junction point 197 to the calibrated voltage source 191 across a current measuring resistor 198.

The drive circuit 194 measures the collector current of a test component, such as the transistor 193, and drives the amplifier 199 to modify the base current in order to produce the set collector current regardless of the gain of the transistor 193 under test.

The amplifier 199 is connected to the I_B generator 201, which is a floating power supply providing a base drive power source to the base 202 of the transistor 193. The I_B generator 201 is connected through a junction 203 and across an adjustable base current measuring resistor 204 to the junction 195.

The forward D.C. current gain having the symbol $h_{FE}$ has been defined as the common emitter D.C. short circuit forward current transfer ratio or current gain, and therefore the module B which is designed to test substantially all transistors to assure that the current gain is equal to or higher than the design value, has been set up in a common emitter configuration.

The current measuring resistors 198 and 204 produce voltages proportional to the collector current and to the base current respectively.

The voltage across the resistor 198 provides a signal to the $I_c$ set 194 as well as a voltage to the decision amplifier 205 which may be compared with the voltage at the junction point 203 resulting from the base current. Since the base current measuring resistor 204 is adjustable, and may be set so that $h_{FE}$ is equal to $$\frac{R_b}{R_c}$$

the voltage developed across the two resistors 198 and 204 will be equal when a transistor having the set $h_{FE}$ is tested.

The junction points 197 and 203 are both connected to the decision amplifier 205 which measures the sum of the two voltages developed across the current measuring resistors 198 and 204. The decision point occurs when the sum is equal to 0, and the reject storage or memory 206 is energized to activate the reject control 167 in the timer circuit at the proper time. A transistor 193 under test would be rejected when the forward D.C. current gain $h_{FE}$ is lower than the preset value.

A third type of test module D is illustrated in the block diagram of FIGURE 17 and consists of a versatile voltage measuring test circuit which may be used to measure the saturation voltage ($V_{CE(SAT)}$ or $V_{BE}$) of transistors, or the voltage across resistors, and the forward voltage across diodes.

This module D contains two calibrated current sources 211 and 212 for providing a preset current from 10 microamps to 500 microamps and from 1 microamp to 100 microamps, respectively, and these currents are applied to the device under test 213. The decision amplifier 214 measures the voltage across a portion of the component under test, such as the voltage between the collector and emitter, or the voltage between the base and emitter of a transistor, by comparing this voltage with a maximum voltage set by the circuit 215 which may be set from 10 millivolts to 10 volts. A reject signal is applied to the reject storage circuit 216, when the voltage across the component exceeds that set on the $V_{max}$ set circuit 215, and a signal goes to the reject control 167 on the timer module at the proper time.

Test Module A

Test module A is a highly flexible resistance measuring device, and the parameter selector switch 34 may be used to connect the device under test 182 in various different ways. In the detailed circuit diagram of FIGURE 18, illustrating one preferred embodiment of this particular module, the transistor 251 may be connected by the three sections of the parameter switch 34a, 34b and 34c to automatically measure $BV_{CBO}$, $BV_{EBO}$ and $I_{EBO}$, or $BV_{CES}$ and $BV_{CER}$. In the position shown in FIGURE 18, two-terminal components may also be tested, for example the internal resistance of diodes and the resistance of resistors may be determined by measuring the current therethrough at a preset voltage.

Calibrated Constant Voltage Supply 181

The plus 300 volts soak and no soak voltages from the test module are connected as shown through the section 35a of the polarity switch 35, through the range switch 37 to a voltage divider network 252.

In the X1 position of the range switch 37, the plus 300 volts goes through a resistance 253 and a potentiometer 254 which may be adjusted to provide a predetermined voltage such as 10 volts across the potentiometer 39 which provides a fine adjustment for the voltage range at 10 millivolts per division. In the X10 position of the range switch 37 the plus 300 volts goes through the resistors 255 and 256 in parallel and through a potentiometer 257 which may be adjusted to provide a predetermined voltage such as 100 volts across the potentiometer 39 to provide an adjustment for the voltage range at 100 millivolts per division.

The preset voltage from the potentiometer 39 is applied through a resistance 258 to a D.C. amplifier 259 which is provided with a balance adjustment potentiometer 31 which is used to balance the drift of the D.C. amplifier 259.

The output from the amplifier 259 is connected through a neon tube 261 which drops the voltage to the grid of vacuum tube 262 which is connected as a cathode follower to provide a negative voltage to section 35c of a polarity switch 35. The cathode and grid of tube 262 are connected through the resistors 263 and 264 respectively to minus 300 volts, and the cathode is also connected through the resistance 265 and across a condenser 266 to provide a high feedback to the amplifier 259 for providing a short circuit proof source with a maximum current of 15 milliamps. The cathode of tube 262 is also connected through the contacts K12A of the relay K12 and through a resistor 267 to a junction point 268. A relay K12 is actuated by a signal from the self test control circuit 176 in the timing module at the proper time in the test cycle.

This regulated voltage may be connected through section 35c of the polarity switch 35 to either section 34a or 34b of the parameter switch 34 and in conjunction with the corresponding connections through section 35d to the junction point 269 reverses the polarity of the voltage applied across the transistor 251 depending on whether the transistor is an NPN or a PNP transistor.

Current Attenuator 183

The current through the transistor 251 from the junction point 269 goes through a resistor 271 to the junction point 268 and also through the current multiplier switch 36. In the X100 position a portion of the current is by-passed through a resistor 272 to ground and in the X10 position a portion of the current is bypassed to ground through the resistor 273 having a different value. In the X1 position of the multiplier switch a portion of the current goes through another resistor 274 to the junction point 268.

It will be apparent that in the different positions of the multiplier switch 36 the current to the junction point 268 is attenuated in different degrees, and this current is applied to the decision amplifier 184 which is a high gain chopper stabilized amplifier which functions as an algebraic adder with two input sources.

Measured Current Circuit 185

The other input source to the junction point 268 which is applied to the amplifier 184 is derived from plus 300 volts through the normally closed contacts K12B through a resistance 281 and a potentiometer 282, which may be be utilized to provide a test adjustment to set a particular voltage at some predetermined current flow. The potentiometer 282 is connected across a condenser 283 to ground, and also through the potentiometer 38 to ground, the latter providing an adjustment of the current at 0.1 microamp per division. The wiper of the potentiometer 38 is connected across a resistance 284 to the junction point 268.

Decision Amplifier 184

Amplifier 184 also has a feedback path which consists of a divider network having two resistances 275 and 276 connected to ground, and their junction point is connected through a resistance 277 to the output of amplifier 184. Resistance 275 is connected across the condenser 278, which controls the frequency response of the circuit, and a double Zener diode 279 back to the input of amplifier 184. Diode 279 consists of two Zener diodes back to back formed in a single crystal to keep the amplifier out of saturation in spite of input signals outside of the normal decision range which may result from tests on short or open circuit components.

Reject Storage 186

The decision point is at 0 volts output from the amplifier 184, and if the voltage at the junction point 268 is positive, indicating that the current through the transistor is excessive, then a positive voltage is applied through the resistance 285 to the grid of the thyratron tube 286 in the reject storage circuit 186 to fire this tube, when the signal is received from the test enable circuit 168 in the timing circuit of FIGURES 12 and 14, which consists of removing the negative bias from the screen grid of the tube 286. It should be noted that the control grid of the tube 286 is normally biased to a nonconducting condition through the trim adjustment potentiometer 32 and a voltage divider network having a resistor 287 connected between the potentiometer 32 and plus 300 volts and another resistor 288 connected between the potentiometer 32 and minus 300 volts. The screen grid of tube 286 is also connected across a condenser 289 to ground. The cathode of the tube 286 is connected through the contacts of section 35d of the polarity switch 35 to ground, except in the "off" position.

The anode of tube 286 is connected both directly and through the reject signal light or neon tube 33 and a resistance 291 to the reject control circuit 167 in the timing circuit, so that if the tube 286 has been fired, as a result of a test indicating that the component is not satisfactory, then the reject signal light 33 will be lighted and the corresponding reject solenoid 121 will be actuated during the reject time.

It will be apparent that the tube 286 will be insensitive to any variations of voltage on the control grid, except at the decision time, when the negative bias is removed from the screen grid by a signal from the test enable circuit 168.

Self Test Circuit

During the self test time the plus 25 volt signal from the self test control circuit 176 is applied through the solenoid of relay K12 to ground and actuates the contacts K12A, K12B and K12C. Closing contacts K12A connect the cathode of tube 262 through the resistor 267 to the junction point 268, and removes the plus 300 volts by opening contacts K12B through the measured current circuit 185 to the junction point 268. Relay K12 also closed the contacts K12C, so that, if the circuit is functioning properly and the output from the amplifier 184 is 0, the relay K13 will not be actuated.

During self test time both the soak and no soak voltages to the calibrated constant voltage supply 181 are off and the measured current circuit 185 is open, so the normal condition of both amplifiers 259 and 184 is to have 0 volts output. However, if there is any unbalance in either of these amplifiers exceeding a certain value, such as 50 millivolts, the relay K13 is actuated by either a positive or negative value and closes the contacts K13A to apply plus 25 volts to the error detect circuit 177 in the timer circuit of FIGURE 12.

Test Module B

One preferred embodiment of specific circuitry for implementing the block diagram of FIGURE 16 is illustrated in the specific circuit diagram of FIGURE 19 wherein the test module (B) is again shown for automatically testing the forward D.C. current gain (having the symbol $h_{FE}$), as described previously in conjunction with FIGURE 16.

The operation of this circuit is initiated and controlled by a signal from the soak control timer 165 in the timing circuit shown in FIGURES 12 and 14, wherein the plus 100 volts applied to the anode of tube 221 through the relay K2 will drop to some lower value, such as 8 volts, when the tube 221 is fired at the end of the soak time. This signal is connected to one side of relays K14 and K15. Since the other side of these relays is connected to plus 100 volts, when the signal from the soak control timer circuit drops to a lower value, such as plus 8 volts, these relays K14 and K15 are energized and actuate their contacts simultaneously.

Transferring contacts K14A and K14B connects charged capacitor 301 to the $I_B$ generator circuit 201. Transferring contacts K15A and K15B activates the calibrated voltage circuit 191, and transferring contacts K15C and K15D operatively connects the $I_C$ set circuit 194.

$I_B$ Generator 201

Relay K14 transfers the contacts K14A and K14B from the lower position, as shown in FIGURE 19, to the upper position, so that the capacitor 301, which has been charged from the plus 100 volt source through resistance 302, is now connected across a capacitor 303 to the anode of vacuum tube 304 and through the resistance 505 and section a of the polarity switch 305 to the base of the transistor 193 under test, which corresponds to the transistor 193 in the block diagram of FIGURE 16.

This circuit constitutes the base current ($I_B$) generator 201 of FIGURE 16. The cathode of tube 304 is connected through section B of the polarity switch 305 and through the adjustable base current measuring potentiometer 204 to the emitter 196 of the transistor 193 under test. Potentiometer 204 may be calibrated and used to set the required $h_{FE}$ for the particular type of transistor under test, as described previously.

Calibrated Voltage 191

Contacts K15A transfer from the lower to the upper contacts which still maintain plus 25 volts through the closed contacts K15A to maintain the transistor 306 in its cut-off condition. Contacts K15B are also closed between the plus 25 volts and through the relay K16 to ground, which, after a short time delay, actuates the relay K16 transferring the contacts K16A from the lower to the upper position. The plus 25 volts is now connected through Zener diode 307 to the base of transistor 306.

Since the Zener diode 307 is back biased, the voltage drop across this diode will have some constant value, such as 17 volts, with the other 8 volts across the resistor 308 to ground, and the 8 volts will now appear at the base of the transistor 306 causing it to conduct.

The emitter of transistor 306 is connected through a resistance network to plus 25 volts. The $V_{CC}$ range switch 308 may be set to either of two positions providing a range of 0 to 10 volts or 10 to 20 volts in the position as shown. The potentiometer 309 may be used to vary the $V_{CC}$ voltage between the limits as set on the $V_{CC}$ range switch 308, and this voltage is applied to the base of a current amplifying transistor 310 to vary its conduction. Since the emitter of transistor 310 is connected through section F of the polarity switch 305, in the position shown, to the collector 202 of the transistor 193, the voltage at the collector may be varied in acordance with the position of the $V_{CC}$ potentiometer 309.

$I_C$ Multiplier

The $I_C$ multiplier control 311 has two positions X1 and X2 in which section A varies the connection from the decision amplifier 205 across current sampling resistors 312 and 313 in parallel with potentiometer 204 in accordance with the range of collector currents to be measured. Section A is connected to the grid of vacuum tube 314 in the decision amplifier 205. Section B of the $I_C$ multiplier switch 311 varies the connection from the emitter 196 of the transistor 193 under test through either one of the current sampling resistors 315 and 316 to plus 25 volts through section D of the polarity switch in the position shown. The current sampling resistors 315 and 316 have different values to cover the two ranges of current that can be measured through the collector circuit of the transistor 193. Resistors 315 and 316 are both connected to a junction point 197 from which connections are made to the cathode circuit of tube 314 and to other parts of the test circuit.

$I_C$ Set Circuit 194

The $I_C$ set circuit 194 is operatively connected, when the relay K15 is actuated to transfer contacts K15C and K15D to the upper position. The $I_C$ set circuit 194 is connected to sections C and D of the polarity switch 305 and in effect samples the current through the collector circuit of transistor 193 between the collector 192 and emitter 196 by receiving the voltage across one of the current sampling resistors 315 and 316 which correspond to the current sampling resistor 198 in the block diagram of FIGURE 16.

This voltage is compared with a constant voltage developed in the $I_C$ set circuit 194 and any difference is applied to the summing amplifier 199 which applies a signal through capacitor 318 to the control grid of tube 304 in the $I_B$ generator circuit 201, thus controlling the base current to maintain a constant collector current through the transistor 193. The grid of tube 304 is also connected through resistor 319 to ground.

The contacts K15C in their lower position connect the summing amplifier 199 to the $I_C$ set potentiometer 324 and through a capacitor 320 to section C of the polarity switch which in the upper position of contacts K15C is connected directly to the upper input of summing amplifier 199, through a resistance 338.

The $I_C$ set circuit 194 consists of a battery 321 having a constant voltage output, a resistor 322, a potentiometer 323 and the $I_C$ set potentiometer 324 connected across the resistance 325 and the condenser 326, which are shorted out through the contacts K15C, when they are closed by actuation of the relay K15. This circuit provides a reference voltage through the resistor 327 and through another bias voltage circuit to the lower input of the summing amplifier 199. This latter bias voltage circuit consists of a balance potentiometer 328 in series with a resistor 329 and another potentiometer 330 which are connected across a battery 331 having a constant voltage. Adjustment of balance potentiometer 328 and the fine adjustment of potentiometer 330 is used to balance the drift of the D.C. amplifier 199.

In effect the voltage across current sampling resistors 315 or 316 is compared with the voltage developed by the $I_C$ set circuit 194, and the summing amplifier 199 provides an output which is the difference between these two voltages and applies the signal to the grid of tube 304 in the $I_B$ generator circuit 201 to vary the base current drive, and thus maintain the collector current at a specified predetermined value for the particular transistor being tested.

The junction point between resistors 327 and 329 is connected through a resistor 332 and a potentiometer 333 to ground.

Summing amplifier 199 is provided with a feedback loop for adjusting the gain to some particular value. This feedback loop is similar to that used with amplifier 184 in FIGURE 18 and consists of the resistance 334 which is connected to ground through a resistance 335 and through another resistance 336 across the capacitor 337 back to the upper input of amplifier 199 at the junction point with the input resistance 338.

Decision Amplifier 205

The decision amplifier circuit 205 in effect compares the voltage across the base current sampling potentiometer 204 with the voltage across the collector current sampling resistor 198 (i.e. one of the resistors 315 or 316).

Decision amplifier 205 measures the sum of the two voltages developed across the current measuring resistors 198 and 204. The decision point occurs when the sum of these two voltages equal to zero, and, if the voltage across the adjustable current measuring resistor 204 is more than that for the set $h_{FE}$, an output signal is provided indicating that the transistor 193 being tested is not satisfactory.

The decision amplifier 205 consists of a vacuum tube 314 which has its control grid connected through a resistor 341 to the junction point 203 and its cathode circuit connected to the junction point 197.

Plus 300 volts is applied to the anode of tube 314 through a resistor 342 and to the screen grid through a resistor 343. The screen grid of tube 314 is also connected through a voltage dropping neon tube 344 to its cathode. The cathode circuit of tube 314 consists of the resistor 345 in parallel with the capacitor 346 and is also connected to the control grid through a capacitor 347 in parallel with the diode 348.

The output from tube 314 is applied to tube 351 in a second stage of amplification, and the output is taken from the anode through a resistor 352 and a balance potentiometer 353, which serves to zero the output to the control grid of tube 351. The grid circuit and cathode are both connected through resistors 354 and 355 respectively to minus 300 volts.

Reject Storage 206

The reject storage circuit 206 receives a signal from the anode of tube 351 which is applied through the capacitor 356 to the control grid of a thyratron tube 357 which functions in the same manner as the thyratron tube 286 in module A, as shown in FIGURE 18.

The control grid of tube 357 is biased through a trim potentiometer 358 which is connected across a resistance 359 to plus 300 volts and a resistance 361 to minus 300 volts to provide a trim adjustment for setting the bias on the control grid of tube 357.

During the decision or test time, when a signal from the test enable circuit is applied through the resistance 362 to the screen grid of tube 357, tube 357 will conduct, if a signal appears on the control grid indicating that an unsatisfactory component has been tested having an $h_{FE}$ lower than the preset value. Tube 357 will continue to conduct until the end of the reject time. During reject time a signal will be applied to the reject control circuit 167 in the timing circuit of FIGURES 12 and 14 and will actuate the corresponding reject solenoid 121 through the lead 363 and will light the reject signal light 364 by a connection through the resistance 365 to the reject control circuit 167.

Self Test Circuit

During the self test time plus 25 volts is applied to the relay K17 which will close the contacts K17A and K17B through the relay K18 having two separate windings connected to ground and through the diode network consisting of diodes 366, 367, 368 and 369 to the output of the decision amplifier 199 and to the output of the amplifier 205 respectively. Both of these amplifiers should have a 0 output at this time, but, if either has a positive or a negative signal during the self test period, relay K18 will be actuated, closing the contacts K18A to apply a plus 25 volt self test error signal back to the timing circuit, which will light the corresponding error signal light and the master error signal light 45 on the control panel 29.

Polarity Switch 305

It will be apparent that the polarity switch 305 reverses the polarity of the different parts or sections of the test circuit depending on whether a PNP or an NPN transistor is being tested. Sections A and B reverse the polarity from the $I_B$ generator circuit 201 between the base 202 and the emitter 196 of the transistor under test 193, and sections F and G reverse the polarity of the voltage from the calibrated voltage circuit 191 to the collector 192 and through resistor 198 to the emitter 196 of the transistor 193 under test.

Sections E and D of the polarity switch 305 reverse the connections from the $I_C$ set circuit 194 across the current sampling resistor 198, and section E changes the connection from vacuum tube 351 in the decision amplifier 205 to the reject storage circuit 206.

In the off position of polarity switch 305 sections A, B, F and E are connected to an open contact, section D connects the plus 25 volts to junction point 197 and sections C and D are connected to ground.

Test Module D

The test module (D) is a versatile voltage measuring test circuit which may be used to measure the saturation voltage ($V_{CE(SAT)}$ or $V_{BE}$) of transistors, or the voltage across resistors to accurately determine the resistance thereof, and the forward voltage across diodes to determine the forward resistance thereof.

This module essentially consists of two constant current generators, the $I_C$ current generator or calibrated current source 211 and the $I_B$ current generator or calibrated current source 212, which are shown in the block diagram of FIGURE 17 and in the specific detailed circuit diagram of FIGURE 20. These current generators are capable of supplying from one hundred microamps to five hundred milliamps and from ten microamps to one hundred milliamps, respectively, at voltages up to ten volts applied to the device under test 213.

This test circuit also includes a measured voltage or $V_{MAX}$ set circuit 215 which provides a reference voltage which is compared with the voltage across the component or device under test 213. The decision amplifier 214 provides an output signal to the reject storage circuit 216, when the voltage across the test component exceeds the measured voltage from the $V_{MAX}$ set circuit 215.

$I_C$ Generator 211

The $I_C$ generator 211 is actuated by the relay K18 which is energized by the signal from the soak control timer 165 in the timer circuit of FIGURE 12, and, since one side of the relay K18 is connected to plus 100 volts, when the signal from the soak control timer 165 changes from 100 volts to approximately eight volts, the relay K18 will pick and close the contacts K18A to apply plus 25 volts to the $I_C$ generator 211. At the same time relay K18 transfers the contacts K18B, so that the upper input to the decision amplifier 214 is connected through section F of the parameter selector switch 401 to the collector, base or emitter of the transistor 402 under test, depending upon the position of the parameter switch 401.

The plus 25 volts filtered power is applied through the contacts K18A and across the Zener diode 403 which provides a reference voltage such as twelve volts to the transistor 404 in an emitter follower stage. The base of transistor 404 is also connected through a resistance 405 to the collector and to ground.

The $I_C$ generator 211 consists essentially of two transistors 404 and 408 operating as emitter follower stages connected to a transistor 412 operating as a constant current generator connected to the collector circuit of the transistor 402 under test which is connected in a common emitter configuration.

The output voltage from the transistor 404 appears across the potentiometer 407 and the $I_C$ potentiometer 406, and an adjustable fraction of the voltage across the $I_C$ potentiometer 406 is applied to the base of the transistor 408.

The emitter of transistor 408 is connected through the two lights 409 and 411 which function as a variable resistance depending on temperature, so that the voltage applied to the base of transistor 412 will vary as a straight line function. The emitter of transistor 412 is connected through one of the resistors 416, 417, 418, 419 and 421 to the plus 25 volt filtered power supply through contacts K18A in the five upper positions of the $I_C$ multiplier switch 410.

It will be apparent that in the two lower positions of the $I_C$ multiplier switch 410 that the transistor 412 is not in the circuit, since in the lower two positions section C of the $I_C$ multiplier switch 410 connects the plus 25 volts directly to the emitter of the transistor 402 under test and section B will connect the emitter of transistor 408 through one of the two resistors 414 and 415 directly to the collector of the transistor 402 under test to provide a series resistor constant voltage circuit for collector drive currents of less than one milliamp, which is also controlled by the $I_C$ potentiometer 406.

The collector of transistor 412 is also connected through a bypass capacitor to the common collector ground.

$I_B$ Generator 212

The $I_B$ generator or calibrated current source 212 is similar to the $I_C$ generator circuit 211. This circuit is controlled by the relay K19 which is actuated by the plus 25 volts from the module power control circuit 162 in the timing circuit of FIGURE 14, and transfers the contacts K19A and K19B from the lower position shown in FIGURE 20 in which the capacitor 422 is charged through a resistance 423 from the plus 25 volt source to their upper position in which the capacitor 422 is discharged to provide a floating base current source.

The voltage from capacitor 422 is applied across the capacitor 424 and through the voltage regulating Zener diode 425, as well as a resistance 426, to the base and collector of the transistor 427.

The emitter of transistor 427 is also connected through potentiometer 428 and the $I_B$ potentiometer 429 to the base current drive from the capacitor 422.

An adjustable portion of the voltage across the $I_B$ potentiometer 429 is applied to the base of transistor 431, which also functions as an emitter follower stage. The base current drive from capacitor 422 is also applied through the variable resistance of lights 432 and 433 to the emitter of transistor 431, and also through one of the three resistances 448, 449 and 451 to the emitter of transistor 435 which operates as a constant current generator having its collector connected to the emitter of the transistor 402 under test.

In the three upper positions X1, X3, and X10 of the $I_B$ multiplier switch 434 the resistors 448, 449 and 451 attenuate the current through transistor 435 to varying degrees. In the lower four positions of the $I_B$ multiplier switch 434 for currents of less than one milliamp the circuit is changed in the same manner as the $I_C$ generator circuit 211, so that the emitter of transistor 431 is connected directly through one of the four resistors 444, 445, 446 and 447 directly to the base of the transistor 402 under test which has its emitter directly connected to the plus 25 volts from the discharge of condenser 422.

The collector of transistor 435 is connected to the emitter of the transistor 402 under test, and is also connected through the capacitor 452 to the common ground side of capacitor 422 through the resistor 453.

$V_{MAX}$ Set Circuit 215

The measured voltage or $V_{MAX}$ set circuit 215 includes a constant voltage battery 460, which may be a mercury battery connected through a potentiometer 461, a fixed resistor 462 and another potentiometer 463 to the voltage multiplier switch 464 and to the measured voltage potentiometer 465.

In the X10 position of the voltage multiplier switch 464 the battery 460 is connected directly through the potentiometer 461 to potentiometer 465, and in the X1 position the battery 460 is connected through potentiometer 461, resistor 462 and potentiometer 463 to the measured voltage potentiometer 465 in parallel with the fixed resistance 466.

When the relay K18 is picked at the beginning of the test period, the contacts K18C are closed to connect the measured voltage circuit 215 through a resistor 467, potentiometer 468 and a resistor 469 to ground. The wiper of potentiometer 468 is connected to a bias circuit consisting of a battery 471, resistor 472, balance potentiometer 473 and another fine adjusting potentiometer 474 to adjust the bias voltage to the lower input of decision amplifier 214.

*Decision Amplifier 214*

The decision amplifier 214 measures the voltage across the base or collector circuit of the transistor 402 under test which is connected in the common emitter configuration. This voltage is added in series with the voltage from the $V_{MAX}$ set circuit 215 to set the maximum acceptable voltage drop for an acceptable transistor.

Decision amplifier 214 is provided with a feedback circuit consisting of a capacitor 477 connected in parallel with the double Zener diode 478 and a resistance 479 connected between the output and the input and with the output connected through a resistance 481 to ground. This circuit reduces the circuit gain on the amplifier 214 at high signal amplitudes, thus keeping the amplifier out of saturation, and the condenser 477 controls the frequency response of the circuit. This is a high gain unit such as those commonly used in analog computer circuits, which is wired as an algebraic adder with two input sources.

*Parameter Switch 401*

It will be apparent that the parameter switch 401 through sections A and B changes the polarity of the current applied to the collector circuit of transistor 402 from the $I_C$ generator circuit 211, and sections C and D in a similar manner change the polarity of the current applied from the $I_B$ generator circuit 212 to the base circuit of the transistor 402. Sections E and F of the polarity switch 401 vary the connections from the emitter, base and collector of the transistor 402 under test, to the wiper of the measured voltage potentiometer 465 through section E, and to the uper input of amplifier 214 through section F to the input resistor 476, in order to measure the voltage between the collector and emitter or between the base and the emitter for either NPN or PNP transistors depending on the position of the parameter switch 401 as shown.

*Self Test Circuit*

During the self test time the relay K20 is actuated to close the contacts K20A by a signal from the self test control circuit 176 in the timing circuit of FIGURES 12 and 14, and at this time the output from the decision amplifier 214 is sampled with no power applied to the transistor 402 and with the contacts K18B and K18C in their normal position as shown in FIGURE 20, when the output of the decision amplifier 214 should be zero.

If there is any output from the amplifier 214 through the contacts K20A and resistor 475, and thus through the relay K21 to ground, the contacts K21A will be closed aplying a 25 volt self test error signal to the error detect circuit 177 of the timing circuit in FIGURES 12 and 14. This will light the error signal for the corresponding module as well as the master error signal light 45 on the error indicator 44 of the control panel 29, as shown in FIGURE 3, and as indicated in the circuit diagrams of FIGURES 12 and 14.

*Reject Storage 216*

If the voltage across the device under test 213 is greater than the voltage from the $V_{MAX}$ set circuit 215, as applied to the decision amplifier 214, an output is provided through the capacitor 482 to the control grid of a thyratron tube 483 in the reject storage circuit 216. The grid of this tube is also connected through the bias circuit consisting of potentiometer 484 and resistors 485 and 486 to plus and minus 300 volts, thus providing an adjustable grid bias on the thyratron tube 483.

This reject storage circuit 216 functions in the same manner as the other reject storage circuits 186 and 206, by firing when a signal is received from the decision amplifier 214 during the decision or test time, when the screen grid of the thyratron tube 483 is connected to ground through the test enable circuit 168 in the timing circuit of FIGURE 14. During the reject time when the plus 100 volts is applied to the thyratron plate from the reject control circuit 167, the corresponding reject solenoid 121 will be actuated and the reject signal light 487 will be lighted, if the component is not satisfactory.

*Summary*

It will be apparent that the semi-automatic test equipment of the present invention provides an extremely versatile and high speed test of a wide variety of electronic components and small assemblies, which may be readily adjusted and adapted to test substantially all of the critical characteristics with a minimum of technical knowledge and manual dexterity required for its operation.

Furthermore, the circuitry eliminates or minimizes the high voltage transients which might damage the components under test, and the self checking circuit in each of the test modules functions during every cycle, and will stop the machine and indicate the source of error, if any one or more of the test circuits has drifted out of adjustment.

It is also obvious that all of the circuits function on a go or no-go basis, and that each test module may be individually adjusted to select the desired parameter and the critical values of voltage and/or current, or other particular values, such as the $h_{FE}$, which may be required for a particular test.

The semi-automatic test equipment of the present invention may also be readily adapted for testing the rise and fall time of transistors, or for testing reel packed components, such as diodes, resistors, and other electronic components which are tape mounted on a reel. One or more of the test stations on the turntable 24 may also be connected to the timing circuit of FIGURE 14 and to an oscilloscope for visual display and observation of the component characteristics.

It will also be apparent that the timer circuit of FIGURES 12 and 14 may be adjusted to vary the test conditions in certain test modules, as well as provide for automatic, manual, test and self test operation of the equipment.

While certain of the circuits in the present embodiment utilize vacuum tubes and thyratron tubes, it will be apparent that any one or all of these circuits may be transistorized, if desired.

Obviously, many other modifications and variations of the present invention may be made within the scope of the following claims.

What is claimed is:
1. An automatic component tester comprising;
 (A) A rotary turntable having a plurality of component holders adapted to stop at each of a plurality of stations,
  means for intermittent rotary drive of said turntable,
  means for ejecting components from said holders;
 (B) A plurality of test modules each connected to certain of said stations and adapted to electrically test a component in said holder and provide an output when the component does not meet certain test requirements, means connected to said output for actuating said ejection means when an unsatisfactory component has been tested;
(C) Means at one of said stations for ejecting a satisfactory component which has passed each of the previous tests in said test modules,
means at another one of said stations for resetting said ejection mechanism;
(D) A timing circuit comprising,
means for actuating said intermittent rotary drive means and establishing a dwell time between successive turntable motion periods,
means for establishing a test cycle during the dwell time to apply power to each test module and establish test and reject time periods in each of said modules.

2. An automatic component tester comprising;
(A) A rotary turntable having a plurality of component holders adapted to stop at each of a plurality of stations,
means for intermittent rotary drive of said turntable,
means for ejecting components from said holders;
(B) A plurality of test modules each connected to certain of said stations and adapted to electrically test a component in said holder and indicate whether the component meets certain test requirements,
means connected to said output for actuating said ejection means when an unsatisfactory component has been tested;
(C) Means at one of said stations for ejecting a satisfactory component which has passed each of the previous tests in said test modules,
means at another of said stations for resetting said ejection mechanism;
(D) A timing circuit comprising,
means for actuating said intermittent rotary drive means and establishing an adjustable dwell time between successive turntable motion periods,
means for establishing a test cycle during the dwell time to apply power to each test module and establish test and reject and self test time periods in each of said modules.

3. An automatic component tester comprising;
(A) A rotary turntable having a plurality of component holders adapted to stop at each of a plurality of stations,
means for intermittently rotating said turntable;
means for ejecting components from said holders;
(B) A plurality of test modules each connected to certain of said stations and adapted to electrically test a component in said holder and provide an output when the component does not meet certain test requirements,
means connected to said output for actuating said ejection means when an unsatisfactory component has been tested,
electrical self test circuit means in each of said modules for indicating a malfunction,
(C) Means at one of said stations for ejecting a satisfactory component which has passed each of the previous tests in said test circuits,
means at another one of said stations for resetting said ejection mechanism,
(D) A timing circuit comprising,
means for actuating said intermittent rotary drive means and establishing an adjustable dwell time between successive table motion periods,
means for establishing a test cycle during the dwell time to apply power to each test module and establish test and reject time periods in each of said modules,
means for applying a self test signal to each test module for activating said self test circuits.

4. An automatic component tester comprising;
(A) A rotary turntable having a plurality of component holders mounted around the periphery thereof and adapted to stop at each of a plurality of test and loading stations,
each of said component holders being adapted to receive and make electrical contact with the leads of a component under test and being provided with a solenoid actuated reject mechanism adapted to eject said component,
a plurality of receptacles mounted around the periphery of said turntable at each of said test stations and adapted to receive a component ejected at said station,
a plurality of fixed contacts mounted at each of said test stations and a plurality of corresponding movable contacts mounted on said turntable and connected to said component holder and solenoid,
drive means connected to said turntable and having electrically actuated means for controlling intermittent movement of said turntable,
a solenoid actuated detent mechanism engaging said turntable and a plurality of index holes in said turntable adapted to receive said detent mechanism for stopping said turntable at each of said test stations,
a dual microswitch actuated by said detent mechanism and having one pair of contacts connected to said electrically actuated drive mechanism and adapted to stop said drive mechanism when said detent drops into one of said index holes;
(B) A plurality of test modules each connected to one of said sets of stationary contacts and adapted to be connected through said movable contacts to the component holder at its corresponding test station,
each of said test modules including electrical circuit means for applying certain predetermined voltages and currents to the components mounted in said component holders at the corresponding test stations,
a decision amplifier in each of said test modules connected to said component and adapted to provide an output when said component does not meet certain predetermined requirements in said test module,
a reject storage circuit in each of said test modules adapted to receive a signal from said decision amplifiers and provide an output when said component is not satisfactory,
each of said test modules including an electrical self-test circuit adapted to provide an output signal when a malfunction occurs in one of said test modules,
(C) A timing circuit connected to each of said test modules and to each of said reject solenoids on said component holders through said stationary and movable contacts,
said timing circuit including an adjustable dwell timer and a detent solenoid control connected to said dwell timer and to said detent solenoid for determining the period of time during which the turntable remains at rest and actuating said detent solenoid to release said detent mechanism at the end of said period,
said timing circuit including a plurality of interconnected electrical circuits for providing a test cycle switching sequence with a test cycle interlock circuit connected to the other pair of contacts in said microswitch and adapted to initiate said test cycle when said detent mechanism drops into said index hole,
said test cycle circuits including means for applying power to said test modules and establishing a very short test time during which said reject storage circuit is activated and a subsequent reject time during which said reject solenoids are actuated if the component is not satisfactory.

a self test control circuit initiated by said test cycle interlock for actuating said self test circuits during motion of said turntable and an error detect circuit adapted to receive a signal from each of said self test circuits and connected to said test cycle interlock to stop the next test cycle and prevent further operation of the tester, if an error signal is received from any one of the self test circuits, until the source of trouble has been corrected.

5. An automatic component tester comprising;
(A) A rotary turntable having a plurality of component holders mounted around the periphery thereof and adapted to stop at a plurality of stations,
   each of said component holders being provided with a solenoid actuated reject mechanism,
   drive means connected to said turntable and having electrically actuated means for controlling movement of said turntable,
   a solenoid actuated detent mechanism for stopping said turntable at each of said test stations,
   a microswitch actuated by said detent mechanism and having one pair of contacts connected to said electrically actuated control means to stop said drive mechanism,
(B) A plurality of test modules each connected to one of said component holders at its corresponding test station,
   each of said test modules including electrical circuit means for applying certain pretermined voltages and currents to a component mounted in said component holders at the corresponding test stations,
   a decision amplifier in each of said test modules connected to said component and adapted to provide an output when said component does not meet certain predetermined reqirements in said test circuit,
   a reject storage circuit in each of said test modules adapted to receive a signal from said decision amplifiers and provide an output when said component is not satisfactory,
(C) A timing circuit connected to each of said test modules and to each of said reject solenoids,
   said timing circuit including a dwell timer and a detent solenoid control connected to said dwell timer and to said detent solenoid for determining the period of time during which the turntable remains at rest and actuating said detent solenoid to release said detent mechanism at the end of said period,
   said timing circuit also including a plurality of inter-connected electrical circuits for providing a test cycle switching sequence with a test cycle interlock circuit connected to another pair of contacts in said microswitch and adapted to initiate said test cycle,
   said test cycle circuits including means for applying power to said test circuits and establishing a very short test time during which said reject storage circuit is activated and a subsequent reject time during which said reject solenoids are actuated if the component is not satisfactory.

6. An automatic component tester as set forth in claim 5 wherein;
   each of said test modules is provided with a self test circuit,
   said timing circuit also includes a self test control circuit initiated by said test cycle interlock for actuating said self test circuits during motion of said turntable and an error detect circuit adapted to receive a signal from each of said self test circuits and connected to said test cycle interlock to stop the next test cycle and prevent further operation of the tester, if an error signal is received from any one of the test circuits, until the source of trouble has been corrected.

7. An automatic component tester comprising;
(A) A rotary turntable having a plurality of component holders mounted around the periphery thereof and adapted to stop at each of a plurality of stations,
   said turntable having a plurality of index holes corresponding to said stations,
   each of said component holders being adapted to receive and make electrical contact with the leads of a component under test and being provided with a solenoid actuated reject mechanism adapted to eject said component,
   a plurality of receptacles mounted around the periphery of said turntable at certain of said stations and adapted to receive a component ejected at said station,
   a plurality of fixed contacts mounted at certain of said stations and a plurality of corresponding movable contacts mounted on said turntable and connected to said component holder and solenoid,
   drive means connected to said turntable and having electrically actuated means for controlling mevement of said turntable,
   a solenoid actuated detent mechanism engaging said turntable,
   a microswitch actuated by said detent mechanism and having one pair of contacts connected to said electrically actuated control means and adapted to stop said drive mechanism when said detent drops into said index hole,
(B) A plurality of test modules each connected to one of said sets of stationary contacts and adapted to be connected through said movable contacts to the component holder at its corresponding test station,
   each of said test modules including electrical circuit means for applying certain predetermined voltages and currents to a component mounted in said component holders at the corresponding test stations,
   a decision amplifier in each of said test modules connected to said component and adapted to provide an output when said component does not meet certain predetermined requirements in said test circuit,
   a reject storage circuit in each of said test modules adapted to receive a signal from said decision amplifiers and provide an output when said component is not satisfactory,
   each of said test modules including an electrical self-test circuit adapted to provide an output signal when a malfunction occurs in one of said test circuits,
(C) A timing circuit connected to each of said test modules and also connected to said detent solenoid, said microswitch and said reject solenoid, and including,
   a module power control adapted to be connected to a power supply and provide power to said test circuits,
   a test cycle interlock connected to another pair of contacts in said microswitch and actuated thereby when said detent solenoid is actuated and released when said detent mechanism drops into one of said index holes,
   a start test cycle connected to said test cycle interlock circuit for actuation thereby and connected to said module power control for controlling the power supply to certain of said test modules, a soak control timer connected to said start test cycle for actuation thereby and also connected to said module power control for controlling power to certain of said test modules, a start test circuit connected to said soak control timer and actuated thereby, a stop test circuit connected to said start test circuit and actuated thereby, a test enable circuit connected to said start test circuit and said stop test circuit and to each of said test modules for establishing a short test time during which a decision is made as to whether the component is satisfactory, a reject time circuit connected to said stop test circuit, a reject control circuit connected to said soak control timer and said start test circuit for energizing said reject storage circuit and also connected to said reject time circuit and to said reject solenoids for actuating said reject solenoid when the component is not satisfactory for ejection thereof into one of said receptacles, an adjustable dwell timer connected to said test cycle interlock and a detent solenoid control connected to said dwell timer and to said detent solenoid for determining the period of time during which the turntable remains at rest and actuating said detent solenoid to withdraw said detent mechanism at the end of said period, a detent release and reset circuit connected to said test cycle interlock and to said adjustable dwell timer for releasing said detent during movement of said turntable, a self-test time circuit connected to said detent release and reset circuit, a self-test control circuit connected to said self-test time circuit and to each of said test modules for actuating said self-test circuits, an error detect circuit connected to each of said test modules for receiving a self-test error signal therefrom and also connected to said test cycle interlock to stop the cycling and prevent further operation of said component tester and also connected to said self-test control for maintaining a self-test voltage on said test modules until the source of trouble has been corrected.

8. An automatic component tester as set forth in claim 7 wherein;

a control panel is provided with a plurality of controls interconnected in the circuits of said test modules for varying the parameters and polarity and setting said predetermined voltages and current as well as other values for the test required for a particular component, another control panel is provided with a plurality of controls interconnected in said timing circuit for selecting the mode of operation and adjusting the soak and dwell time as well as controlling the operation of the tester.

9. In an automatic component tester including a turntable having a plurality of component holders with reject solenoids adapted to stop at a plurality of test stations, a solenoid actuated detent and microswitch, and a plurality of test modules with self-test and reject storage circuits associated with each test station, the improvement comprising;

a timing circuit connected to said test modules and reject solenoids, said timing circuit including an adjustable dwell timer and a detent solenoid control connected to said dwell timer and to said detent solenoid for determining the period of time during which the turntable remains at rest and actuating said detent solenoid to release said detent mechanism at the end of said period, said timing circuit including a plurality of interconnected electrical circuits for providing a test cycle switching sequence with a test cycle interlock circuit connected to contacts in said microswitch and adapted to initiate said test cycle.

said test cycle circuits including means for applying power to said test modules and establishing a very short test time during which said reject storage circuits are activated and a subsequent reject time during which said reject solenoids are actuated if the component is not satisfactory, a self-test control circuit initiated by said test cycle interlock for actuating said self-test circuits during motion of said turntable and an error detect circuit adapted to receive a signal from each of said self-test circuits and connected to said test cycle interlock to stop the next test cycle and prevent further operation of the tester if an error signal is received from any one of the test circuits until the source of trouble has been corrected.

10. In an automatic component tester having a plurality of test modules with self-test circuits associated with a turntable assembly including a detent solenoid and microswitch and a plurality of component holders with reject solenoids, the improvement comprising;

a module power control adapted to be connected to a power supply and provide power to said test modules, a test cycle interlock connected to one pair of contacts in said microswitch and actuated thereby, a start test cycle connected to said test cycle interlock circuit for actuation thereby and connected to said module power control for controlling the power supply to certain of said test modules, a soak control timer connected to said start test cycle for actuation thereby and also connected to said module power control for controlling power to certain of said test modules, a start test circuit connected to said soak control timer and actuated thereby, a stop test circuit connected to said start test circuit and actuated thereby, a test enable circuit connected to said start test circuit and said stop test circuit and to each of said test modules for establishing a short test time during which a decision is made as to whether the component is satisfactory, a reject time circuit connected to said stop test circuit, a reject control circuit connected to said soak control timer and said start test circuit for energizing said reject storage circuit and also connected to said reject time circuit and to said reject solenoids for actuating said reject solenoids when the component is not satisfactory, an adjustable dwell timer connected to said test cycle interlock and a detent solenoid control connected to said dwell timer and to said detent solenoid for determining the period of time during which the turntable remains at rest and actuating said detent solenoid at the end of said period, a detent release and reset circuit connected to said test cycle interlock and to said adjustable dwell timer for releasing said detent solenoid during movement of said turntable.

11. An automatic component tester as set forth in claim 10 wherein;

a self-test time circuit is connected to said detent release and reset circuit, a self-test control circuit is connected to a self-test time circuit in each of said test modules for actuating the self test circuits, an error detect circuit is connected to each of said test modules for receiving a self-test error signal therefrom and also connected to said test cycle interlock to stop the cycling and prevent further operation of said component tester and also connected to said self-test control for maintaining a self-test voltage on said test modules until the source of trouble has been corrected.

12. In an automatic component tester having a rotary turntable with a plurality of component holders adapted to stop at each of a plurality of test stations and a timing circuit for intermittently rotating said turntable and providing test, reject and self-test power, the improvement comprising;
(A) A test module connected to said timing circuit and adapted to be connected to a component on said turntable including,
a calibrated constant voltage supply to be applied to the component under test,
a decision amplifier,
a current attenuator to be connected between the component under test and said decision amplifier,
a measured current circuit connected to said decision amplifier,
a reject storage circuit adapted to receive a signal from said decision amplifier when the current through the component being tested is greater than the measured current and connected to said timing circuit for actuating a reject mechanism on said holder when said component is not satisfactory.

13. An automatic component tester as set forth in claim 12 wherein;
a self test circuit is connected to the output of said decision amplifier after each test period and provides a signal to said timing circuit when said amplifier has an output of a predetermined magnitude with other circuits in the test module de-energized.

14. An automatic component tester as set forth in claim 12 wherein;
a plurality of controls are provided interconnected in the circuits of said test module for selecting the parameter to be tested and setting the polarity and soak period as well as adjusting the voltages and currents for the test required with a particular component.

15. In an automatic component tester having a rotary turntable with a plurality of test stations and a timing circuit for intermittently rotating said turntable and providing test, reject and self test power, the improvement comprising;
(A) A test module for automatically testing the forward D.C. current gain of transistors comprising,
a calibrated voltage source adapted to be connected to the collector of the transistor and through a current measuring resistor to the emitter of the transistor,
a base current generator adapted to be connected to the base of the transistor and through an adjustable current measuring resistor to the emitter of the transistor,
a collector current setting circuit connected across said collector current measuring resistor and including an amplifier connected to said base current generator for maintaining a constant collector current,
a decision amplifier connected across both of said current measuring resistors and adapted to provide an output signal when the forward D.C. current gain is lower than the preset value,
and a reject storage circuit connected to the said decision amplifier and adapted to provide a signal to said timing circuit for rejecting an unsatisfactory component.

16. An automatic component tester as set forth in claim 15 wherein;
a self test circuit in said module is connected to both of said amplifiers by the self test signal and provides an error signal to the timing circuit if either of said amplifiers is malfunctioning.

17. An automatic component tester as set forth in claim 15 wherein;
a plurality of controls are provided interconnected in the circuits of said test module for setting the forward D.C. current gain and the voltages and currents required for the particular component being tested.

18. In an automatic component tester having a rotary turntable with a plurality of test stations and a timing circuit for intermittently rotating said turntable and providing test, reject and self test power, the improvement comprising;
(A) A test module connected to said timing circuit and including,
a calibrated current source to be connected across the collector circuit of a transistor under test,
a second calibrated current source to be connected across the base circuit of a transistor under test,
a measured voltage $V_{MAX}$ set circuit,
a decision amplifier to be connected to the device under test and to said measured voltage circuit and adapted to provide an output when the voltage across said transistor under test is greater than the maximum voltage set on the measured voltage circuit,
and a reject storage circuit connected to said decision amplifier and connected to said timing circuit for rejecting an unsatisfactory component.

19. An automatic component tester as set forth in claim 18 wherein;
a self check circuit is connected to the output of said decision amplifier after each test period and provides a signal to said timing circuit when said amplifier has an output of a predetermined magnitude with other circuits in the test module de-energized.

20. An automatic component tester as set forth in claim 18 wherein;
a plurality of controls are provided interconnected in the circuits of said test module for selecting the parameter to be tested and setting the polarity and adjusting the voltages and currents for the test required with a particular component.

References Cited in the file of this patent
UNITED STATES PATENTS
3,032,191    Clukey _____ May 1, 1962